(12) United States Patent
Craig et al.

(10) Patent No.: US 8,578,050 B2
(45) Date of Patent: *Nov. 5, 2013

(54) METHODS, SYSTEMS, AND COMPUTER READABLE MEDIA FOR PROVIDING PEER ROUTING AT A DIAMETER NODE

(75) Inventors: Jeffrey Alan Craig, Durham, NC (US); Mark Edward Kanode, Apex, NC (US); Kedar Kashinath Karmarkar, Pune (IN); David Michael Sprague, Raleigh, NC (US); Mahesh Tomar, Morrisville, NC (US); Donald E. Wallace, Evergreen, CO (US)

(73) Assignee: Tekelec, Inc., Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/026,076

(22) Filed: Feb. 11, 2011

(65) Prior Publication Data

US 2011/0202676 A1 Aug. 18, 2011

Related U.S. Application Data

(60) Provisional application No. 61/304,310, filed on Feb. 12, 2010, provisional application No. 61/373,636, filed on Aug. 13, 2010.

(51) Int. Cl.
*H04L 12/58* (2006.01)
*G06F 15/173* (2006.01)

(52) U.S. Cl.
USPC .......................................... 709/238; 370/401

(58) Field of Classification Search
USPC .................. 709/230, 232–237, 238–244; 370/351–430
See application file for complete search history.

(56) References Cited

U.S. PATENT DOCUMENTS

| 5,228,083 | A | 7/1993 | Lozowick et al. |
| 5,719,861 | A | 2/1998 | Okanoue |

(Continued)

FOREIGN PATENT DOCUMENTS

| CA | 2 716 544 A1 | 12/2010 |
| EP | 1 134 939 A1 | 9/2001 |

(Continued)

OTHER PUBLICATIONS

Notification of Transmittal of the International Search Report and the Written Opinion of the International Searching Authority, or the Declaration for International Application No. PCT/US2010/053062 (Jun. 28, 2011).

(Continued)

*Primary Examiner* — Shirley Zhang
(74) *Attorney, Agent, or Firm* — Jenkins, Wilson, Taylor & Hunt, P.A.

(57) ABSTRACT

Methods, systems, and computer readable media for providing local application routing at a Diameter node are disclosed. In one example, the method includes receiving, at an ingress Diameter message processor associated with a Diameter signaling router (DSR), a Diameter message from a first Diameter node. The method further includes accessing, using the ingress Diameter message processor, Diameter peer routing information to determine an egress Diameter message processor among a plurality of egress Diameter message processors within the DSR and associated with a second Diameter node that is a peer of the DSR and to which the Diameter message is to be forwarded. The method also includes forwarding the Diameter message to the determined egress Diameter message processor.

28 Claims, 19 Drawing Sheets

(56) References Cited

U.S. PATENT DOCUMENTS

| | | | |
|---|---|---|---|
| 6,157,621 A | 12/2000 | Brown et al. | |
| 6,273,622 B1 | 8/2001 | Ben-David | |
| 6,304,273 B1 | 10/2001 | Bonnet | |
| 6,584,073 B1 | 6/2003 | Steele, Jr. et al. | |
| 6,795,546 B2 | 9/2004 | Delaney et al. | |
| 6,819,652 B1 | 11/2004 | Aravamudhan et al. | |
| 6,865,153 B1 | 3/2005 | Hill et al. | |
| 6,915,345 B1 | 7/2005 | Tummala et al. | |
| 6,918,041 B1 | 7/2005 | Chen | |
| 6,954,790 B2 | 10/2005 | Forslöw | |
| 6,967,956 B1 | 11/2005 | Tinsley et al. | |
| 7,042,877 B2 | 5/2006 | Foster et al. | |
| 7,043,000 B2 | 5/2006 | Delaney et al. | |
| 7,136,635 B1 | 11/2006 | Bharatia et al. | |
| 7,257,636 B2 | 8/2007 | Lee et al. | |
| 7,286,516 B2 | 10/2007 | Delaney et al. | |
| 7,292,592 B2 | 11/2007 | Rune | |
| 7,298,725 B2 | 11/2007 | Rune | |
| 7,333,438 B1 | 2/2008 | Rabie et al. | |
| 7,333,482 B2 | 2/2008 | Johansson et al. | |
| 7,383,298 B2 | 6/2008 | Palmer et al. | |
| 7,403,492 B2 | 7/2008 | Zeng et al. | |
| 7,403,537 B2 | 7/2008 | Allison et al. | |
| 7,466,807 B2 | 12/2008 | McCann et al. | |
| 7,551,926 B2 | 6/2009 | Rune | |
| 7,567,796 B2 | 7/2009 | Tammi et al. | |
| 7,583,963 B2 | 9/2009 | Tammi et al. | |
| 7,590,732 B2 | 9/2009 | Rune | |
| 7,633,872 B2 | 12/2009 | Pitcher et al. | |
| 7,633,969 B2 | 12/2009 | Caugherty et al. | |
| 7,706,343 B2 | 4/2010 | Delaney et al. | |
| 7,792,981 B2 | 9/2010 | Taylor | |
| 7,822,023 B2 | 10/2010 | Lahetkangas et al. | |
| 7,894,353 B2 | 2/2011 | Li et al. | |
| 7,898,957 B2 * | 3/2011 | Lea et al. | 370/235 |
| 7,916,685 B2 | 3/2011 | Schaedler et al. | |
| 7,961,685 B2 | 6/2011 | Suh et al. | |
| 7,996,007 B2 | 8/2011 | Bantukul | |
| 7,996,541 B2 | 8/2011 | Marathe et al. | |
| 8,041,021 B2 | 10/2011 | Xu et al. | |
| 8,045,983 B2 | 10/2011 | Bantukul | |
| 8,170,035 B2 | 5/2012 | Furey et al. | |
| 8,170,055 B2 | 5/2012 | Fang et al. | |
| 2001/0024443 A1 | 9/2001 | Alriksson et al. | |
| 2002/0049901 A1 | 4/2002 | Carvey | |
| 2002/0051427 A1 | 5/2002 | Carvey | |
| 2002/0087723 A1 | 7/2002 | Williams et al. | |
| 2002/0133494 A1 | 9/2002 | Goedken | |
| 2002/0133534 A1 | 9/2002 | Forslow | |
| 2002/0141346 A1 | 10/2002 | Garcia-Luna-Aceves et al. | |
| 2002/0181507 A1 | 12/2002 | Jones | |
| 2003/0095536 A1 | 5/2003 | Hu et al. | |
| 2003/0115358 A1 | 6/2003 | Yun | |
| 2004/0037278 A1 * | 2/2004 | Wong et al. | 370/389 |
| 2004/0042485 A1 | 3/2004 | Gettala et al. | |
| 2004/0098612 A1 | 5/2004 | Lee et al. | |
| 2005/0002417 A1 | 1/2005 | Kelly et al. | |
| 2005/0099964 A1 | 5/2005 | Delaney et al. | |
| 2005/0232236 A1 | 10/2005 | Allison et al. | |
| 2005/0232407 A1 | 10/2005 | Craig et al. | |
| 2005/0235065 A1 * | 10/2005 | Le et al. | 709/238 |
| 2005/0246545 A1 | 11/2005 | Reiner | |
| 2005/0246716 A1 | 11/2005 | Smith et al. | |
| 2006/0045249 A1 | 3/2006 | Li et al. | |
| 2006/0077926 A1 | 4/2006 | Rune | |
| 2006/0101159 A1 * | 5/2006 | Yeh et al. | 709/246 |
| 2006/0104210 A1 | 5/2006 | Nielsen | |
| 2006/0123477 A1 | 6/2006 | Raghavan et al. | |
| 2006/0172730 A1 | 8/2006 | Matsuda | |
| 2006/0177007 A1 | 8/2006 | Vaghar et al. | |
| 2006/0200670 A1 | 9/2006 | Kuffel et al. | |
| 2006/0221972 A1 | 10/2006 | Bhargava et al. | |
| 2006/0253563 A1 | 11/2006 | Yang et al. | |
| 2006/0274744 A1 | 12/2006 | Nagai et al. | |
| 2007/0047539 A1 | 3/2007 | Agarwal et al. | |
| 2007/0153995 A1 | 7/2007 | Fang et al. | |
| 2007/0168421 A1 | 7/2007 | Kalyanpur et al. | |
| 2007/0214209 A1 | 9/2007 | Maeda | |
| 2007/0280447 A1 | 12/2007 | Cai et al. | |
| 2007/0297419 A1 | 12/2007 | Askerup et al. | |
| 2008/0025230 A1 | 1/2008 | Patel et al. | |
| 2008/0039104 A1 | 2/2008 | Gu et al. | |
| 2008/0144602 A1 | 6/2008 | Casey | |
| 2008/0167035 A1 | 7/2008 | Buckley et al. | |
| 2008/0212576 A1 | 9/2008 | O'Neill | |
| 2008/0301162 A1 | 12/2008 | Wall et al. | |
| 2008/0317247 A1 | 12/2008 | Jeong et al. | |
| 2009/0080440 A1 | 3/2009 | Balyan et al. | |
| 2009/0083861 A1 | 3/2009 | Jones | |
| 2009/0129271 A1 | 5/2009 | Ramankutty et al. | |
| 2009/0138619 A1 | 5/2009 | Schnizlein et al. | |
| 2009/0185494 A1 | 7/2009 | Li et al. | |
| 2009/0193071 A1 | 7/2009 | Qiu et al. | |
| 2009/0232011 A1 | 9/2009 | Li et al. | |
| 2010/0017846 A1 | 1/2010 | Huang et al. | |
| 2010/0042525 A1 | 2/2010 | Cai et al. | |
| 2010/0135287 A1 | 6/2010 | Hosain et al. | |
| 2010/0251330 A1 | 9/2010 | Kroeselberg et al. | |
| 2010/0265948 A1 | 10/2010 | Patel et al. | |
| 2010/0299451 A1 * | 11/2010 | Yigang et al. | 709/241 |
| 2011/0060830 A1 | 3/2011 | Kang et al. | |
| 2011/0116378 A1 | 5/2011 | Ramankutty et al. | |
| 2011/0116382 A1 * | 5/2011 | McCann et al. | 370/241 |
| 2011/0188397 A1 | 8/2011 | McCann et al. | |
| 2011/0199895 A1 | 8/2011 | Kanode et al. | |
| 2011/0199906 A1 * | 8/2011 | Kanode et al. | 370/235 |
| 2011/0200047 A1 | 8/2011 | McCann et al. | |
| 2011/0200053 A1 * | 8/2011 | Kanode et al. | 370/401 |
| 2011/0200054 A1 * | 8/2011 | Craig et al. | 370/401 |
| 2011/0202604 A1 * | 8/2011 | Craig et al. | 709/205 |
| 2011/0202612 A1 * | 8/2011 | Craig et al. | 709/206 |
| 2011/0202613 A1 * | 8/2011 | Craig et al. | 709/206 |
| 2011/0202614 A1 * | 8/2011 | Graig et al. | 709/206 |
| 2011/0202676 A1 * | 8/2011 | Craig et al. | 709/238 |
| 2011/0202677 A1 * | 8/2011 | Craig et al. | 709/238 |
| 2011/0202684 A1 * | 8/2011 | Craig et al. | 709/244 |
| 2011/0225280 A1 | 9/2011 | Delsesto et al. | |
| 2011/0225306 A1 | 9/2011 | Delsesto et al. | |
| 2011/0302244 A1 | 12/2011 | McCann et al. | |
| 2011/0314178 A1 * | 12/2011 | Kanode et al. | 709/238 |
| 2012/0155389 A1 | 6/2012 | McNamee et al. | |
| 2012/0224524 A1 | 9/2012 | Marsico | |

FOREIGN PATENT DOCUMENTS

| | | | |
|---|---|---|---|
| EP | 1 328 102 A1 | 7/2003 | |
| EP | 1 465 385 A1 | 10/2004 | |
| EP | 1 314 324 B1 | 8/2008 | |
| EP | 1 847 076 B1 | 2/2012 | |
| WO | WO 2008/087633 A2 | 7/2008 | |
| WO | WO 2009/058067 A1 | 5/2009 | |
| WO | WO 2009/070179 A1 | 6/2009 | |
| WO | WO 2009/134265 A1 | 11/2009 | |
| WO | WO 2011/047382 A2 | 4/2011 | |
| WO | WO 2011/100587 A2 | 8/2011 | |
| WO | WO 2011/100594 A2 | 8/2011 | |
| WO | WO 2011/100600 A2 | 8/2011 | |
| WO | WO 2011/100606 A2 | 8/2011 | |
| WO | WO 2011/100609 A2 | 8/2011 | |
| WO | WO 2011/100610 A2 | 8/2011 | |
| WO | WO 2011/100612 A2 | 8/2011 | |
| WO | WO 2011/100615 A2 | 8/2011 | |
| WO | WO 2011/100621 A2 | 8/2011 | |
| WO | WO 2011/100626 A2 | 8/2011 | |
| WO | WO 2011/100629 A2 | 8/2011 | |
| WO | WO 2011/100630 A2 | 8/2011 | |
| WO | WO 2012/119147 A1 | 9/2012 | |

OTHER PUBLICATIONS

Znaty, "Diameter, GPRS, (LTE+ePC=EPS), IMS, PCC and SDM," EFORT, pp. 1-460 (May 2010).

"Ericsson Unified Number Portability," (Downloaded from the Internet on Jan. 24, 2011).

(56) References Cited

OTHER PUBLICATIONS

"3rd Generation Partnership Project; Technical Specification Group Core Network and Terminals; Policy and Charging Control signalling flows and Quality of Service (QoS) parameter mapping (Release 9)," 3GPP TS 29.213, V9.2.0, pp. 1-129 (Mar. 2010).
"Traffix Diameter Gateway; Instant Diameter Connection to any Network Element," Traffix Systems, pp. 1-4 (Publication Date Unknown) (Downloaded from the Internet on Feb. 8, 2010).
"Traffix Diameter Load Balancer; Scaling the Diameter Control Plane," Traffix Systems, pp. 1-4 (Publication Date Unknown) (Downloaded from the Internet on Feb. 8, 2010).
"Next Generation Networks Load Balancing—The Key to NGN Control, Management, and Growth," Whitepaper by Traffix Systems, pp. 1-7 (Publication Date Unknown) (Downloaded from the Internet on Feb. 8, 2010).
"Univerisal Mobile Telecommunications Systems (UMTS); LTE; InterWorking Function (IWF) Between MAP Based and Diameter Based Interfaces (3GPP TS 29.305 Version 9.0.0 Release 9)," ETSI TS 129 305 V9.0.0 (Jan. 2010).
"Digital Cellular Telecommunications System (Phase 2+); Universal Mobile Telecommunications System (UMTS); LTE; IP Multimedia (IM) Subsystem Cx and Dx Interfaces; Signalling Flows and Message Contents (3GPP TS 29.228 Version 8.7.0 Release 8)," ETSI TS 129 228 v8.7.0 (Jan. 2010).
"Mapping Diameter Interfaces to Functionality in 3GPP/3GPP2 IMS Architecture," Whitepaper by Traffix Systems, pp. 1-10 (Copyright 2010).
Jones et al., "Diameter Extended NAPTR," Individual Submission Internet-Draft, draft-ietf-dime-extended-naptr-00, pp. 1-9 (Dec. 29, 2009).
Korhonen et al., "Clarifications on the Routing of Diameter Requests Based on the Username and the Realm," RFC 5729, pp. 1-9 (Dec. 2009).
3GPP, "3rd Generation Partnership Project; Technical Specification Group Services and System Aspects; Generic Authentication Architecture (GAA); Generic Bootstrapping Architecture (Release 9)," 3GPP TS 33.220 V9.2.0 (Dec. 2009).
3GPP, "3rd Generation Partnership Project; Technical Specification Group Service and System Aspects; Telecommunication Management; Charging Management; Diameter Charging Applications (Release 9)," 3GPP TS 32.299 V9.2.0 (Dec. 2009).
3GPP, "3rd Generation Partnership Project; Technical Specification Group Service and System Aspects; Telecommunication Management; Charging Management; Online Charging System (OCS): Applications and Interfaces (Release 9)," 3GPP TS 32.296 V9.1.0 (Dec. 2009).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
3GPP, "3rd Generation Partnership Project; Technical Specification Group Core Network and Terminals; Sh Interface Based on the Diameter Protocol; Protocol Details (Release 9)," 3GPP TS 29.329 V9.0.0 (Dec. 2009).
3GPP, "3rd Generation Partnership Project; Technical Specification Group Core Network and Terminals; IP Multimedia (IM) Subsystem Sh Interface; Signalling Flows and Message Contents (Release 9)," 3GPP TS 29.328 V9.0.0 (Dec. 2009).
3GPP, "3rd Generation Partnership Project; Technical Specification Group Core Network and Terminals; 3GPP System to Wireless Local Area Network (WLAN) Interworking; Stage 3 (Release 9)," 3GPP TS 29.234 V9.0.0 (Dec. 2009).
3GPP, "3rd Generation Partnership Project; Technical Specification Group Core Network and Terminals; Cx and Dx Interfaces Based on the Diameter Protocol; Protocol Details (Release 9)," 3GPP TS 29.229 V9.0.0 (Dec. 2009).
3GPP, "3rd Generation Partnership Project; Technical Specification Group Core Network and Terminals; IP Multimedia (IM) Subsystem Cx and Dx Interfaces; Signalling Flows and Message Contents (Release 9)," 3GPP TS 29228 V9.0.0 (Dec. 2009).
3GPP, "3rd Generation Partnership Project; Technical Specification Group Core Network and Terminals; Policy and Charging Control Over Rx Reference Point (Release 9)," 3GPP TS 29.214 V9.2.0 (Dec. 2009).
3GPP, "3rd Generation Partnership Project; Technical Specification Group Core Network and Terminals; Policy and Charging Control over Gx Reference Point (Release 9)," 3GPP TS 29.212 V9.1.0 (Dec. 2009).
3GPP, "3rd Generation Partnership Project; Technical Specification Group Services and System Aspects; Policy and Charging Control Architecture (Release 9)," 3GPP TS 23.203 V9.3.0 (Dec. 2009).
Jiao et al., "The Diameter Capabilities Update Application," Network Working Group Internet-Draft draft-ietf-dime-capabilities-update-01, pp. 1-8 (Dec. 1, 2009).
Tsou et al., "Realm-Based Redirection in Diameter," Internet Engineering Task Force, draft-ietf-dime-realm-based-redirect-02, pp. 1-7 (Oct. 27, 2009).
Huang et al., "The Diameter Precongestion Notification (PCN) Data Collection Applications," Network Working Group Internet-Draft <draft-huang-dime-pcn-collection-02>, pp. 1-19 (Oct. 26, 2009).
Carlberg et al., "Diameter Priority Attribute Value Pairs," Diameter Maintenance and Extensions (DIME) Internet-Draft <draft-carlberg-dime-priority-avps-00.txt>, pp. 1-6 (Oct. 19, 2009).
Korhonen et al., "Diameter User-Name and Realm Based Request Routing Clarifications," Diameter Maintenance and Extensions (DIME) Internet-Draft, draft-ietf-dime-nai-routing-04.txt, pp. 1-13 (Oct. 6, 2009).
Fajardo et al., "Diameter Base Protocol," DIME Internet-Draft, draft-ietf-dime-rfc3588bis-19.txt, pp. 1-160 (Sep. 2, 2009).
3GPP, "3rd Generation Partnership Project; Technical Specification Group core Network and Terminals; Generic Authentication Architecture (GAA); Zh and Zn Interfaces Based on the Diameter Protocol; Stage 3 (Release 8)," 3GPP TS 29.109 V8.3.0 (Sep. 2009).
3GPP, "3rd Generation Partnership Project; Tecnhical Specification Group Core Network and Terminals; Numbering, Addressing and Identification (Release 8)," 3GPP TS 23.003 V8.6.0 (Sep. 2009)
Jones et al., "Diameter Extended NAPTR," Internet-Draft, draft-jones-dime-extended-naptr-00, pp. 1-8 (Aug. 23, 2009).
Korhonen et al., "Diameter User-Name and Realm Based Request Routing Clarifications," Internet-Draft, draft-ietf-dime-nai-routing-03,txt, pp. 1-11 (Aug. 19, 2009).
Tsou et al., "Session-Specific Explicit Diameter Request Routing," Network Working Group Internet-Draft, draft-tsou-diameter-explicit-routing-03, pp. 1-18 (Aug. 5, 2009).
3GPP, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 8)," ETSI TS 129.272 V8.3.0 (Jun. 2009).
Bhardwaj, "Roaming Hubbing & LTE," GSMA London, pp. 1-11 (May 19, 2009).
3GPP, "3rd Generation Partnership Project; Technical Specification Group Core Network and Terminals; Diameter-based Protocols Usage and Recommendations in 3GPP (Release 8)," 3GPP TR 29.909 V8.1.2 (Jan. 2009).
3GPP, "3rd Generation Partnership Project; Technical Specification Group Service and System Aspects; Telecommunication Management; Charging Management; Charging Data Description for the IP Multimedia Subsystem (IMS) (Release 5)," 3GPP TS 32.225 V5.11.0 (Mar. 2006).
Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).
Aboba et al., "The Network Access Identifier," Network Working Group, RFC 4282, pp. 1-17 (Dec. 2005).
3GPP, "3rd Generation Partnership Project; Technical Specification Group Core Network and Terminals; Policy Control Over Go Interface (Release 6)," 3GPP TS 29.207 V6.5.0 (Sep. 2005).
Eronen et al., "Diameter Extensible Authentication Protocol (EAP) Application," Network Working Group, RFC 4072, pp. 1-31 (Aug. 2005).
Hakala et al., "Diameter Credit-Control Application," Network Working Group RFC 4006, pp. 1-107 (Aug. 2005).

(56) References Cited

OTHER PUBLICATIONS

Calhoun et al., "Diameter Mobile IPv4 Application," Network Working Group, RFC 4004, pp. 1-50 (Aug. 2005).
3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).
Calhoun et al., "Diameter Base Protocol," Network Working Group, RFC 3588, pp. 1-148 (Sep. 2003).
Aboba et al., "Authentication, Authorization and Accounting (AAA) Transport Profile," Network Working Group, RFC 3539, pp. 1-39 (Jun. 2003).
Stewart et al., "Stream Control Transmission Protocol," Network Working Group RFC 2960, pp. 1-134 (Oct. 2000).
Greene et al., "Bi-Directional Session Setup Extension to Diameter," Internet Draft <draft-greene-diameter-ss7-session-00.txt>, pbs. 1-12 (Jul. 1998).
"Diameter Overview," referenced from www.ulticom.com/html/products/signalware-diameter-reference-guide.asp (Publication Date Unknown).
Final Official Action for U.S. Appl. No. 12/906,816 (Feb. 21, 2012).
Applicant-Initiated Interview Summary for U.S. Appl. No. 12/906,816 (Jan. 27, 2012).
Notification of Transmittal of the International Search Report and the Written Opinion of the International Searching Authority, or the Declaration for International Application No. PCT/US2011/024622 (Oct. 31, 2011).
Notification of Transmittal of the International Search Report and the Written Opinion of the International Searching Authority, or the Declaration for International Application No. PCT/US2011/024617 (Oct. 31, 2011).
Notification of Transmittal of the International Search Report and the Written Opinion of the International Searching Authority, or the Declaration for International Application No. PCT/US2011/024614 (Oct. 31, 2011).
Notification of Transmittal of the International Search Report and the Written Opinion of the International Searching Authority, or the Declaration for International Application No. PCT/US2011/024646 (Oct. 28, 2011).
Notification of Transmittal of the International Search Report and the Written Opinion of the International Searching Authority, or the Declaration for International Application No. PCT/US2011/024645 (Oct. 28, 2011).
Notification of Transmittal of the International Search Report and the Written Opinion of the International Searching Authority, or the Declaration for International Application No. PCT/US2011/024642 (Oct. 28, 2011).
Notification of Transmittal of the International Search Report and the Written Opinion of the International Searching Authority, or the Declaration for International Application No. PCT/US2011/024621 (Oct. 28, 2011).
Notification of Transmittal of the International Search Report and the Written Opinion of the International Searching Authority, or the Declaration for International Application No. PCT/US2011/024637 (Oct. 27, 2011).
Notification of Transmittal of the International Search Report and the Written Opinion of the International Searching Authority, or the Declaration for International Application No. PCT/US2011/024629 (Oct. 27, 2011).
Notification of Transmittal of the International Search Report and the Written Opinion of the International Searching Authority, or the Declaration for International Application No. PCT/US2011/024625 (Oct. 25, 2011).
Notification of Transmittal of the International Search Report and the Written Opinion of the International Searching Authority, or the Declaration for International Application No. PCT/US2011/024611 (Oct. 20, 2011).
Notification of Transmittal of the International Search Report and the Written Opinion of the International Searching Authority, or the Declaration for International Application No. PCT/US2011/024601 (Oct. 20, 2011).
Notification of Transmittal of the International Search Report and the Written Opinion of the International Searching Authority, or the Declaration for International Application No. PCT/US2011/024588 (Oct. 20, 2011).
Non-Final Official Action for U.S. Appl. No. 12/906,816 (Oct. 5, 2011).
Jones et al., "Diameter Command Code Registration for the Third Generation Partnership Project (3GPP) Evolved Packet System (EPS)," Network Working Group, RFC 5516, pp. 1-5 (Apr. 2009).
Final Office Action for U.S. Appl. No. 13/026,060 (May 10, 2013).
Notice of Allowance and Fee(s) Due for U.S. Appl. No. 13/026,144 (May 1, 2013).
Notice of Allowance and Fee(s) Due for U.S. Appl. No. 13/026,112 (Apr. 26, 2013).
Notice of Allowance and Fee(s) Due for U.S. Appl. No. 13/026,153 (Apr. 15, 2013).
Notice of Allowance and Fee(s) Due for U.S. Appl. No. 13/026,162 (Apr. 1, 2013).
Supplemental Notice of Allowability for U.S. Appl. No. 13/026,031 (Mar. 22, 2013).
Notice of Allowance and Fee(s) Due for U.S. Appl. No. 13/026,098 (Mar. 11, 2013).
Interview Summary for U.S. Appl. No. 13/026,144 (Mar. 4, 2013).
Supplemental Notice of Allowability for U.S. Appl. No. 13/026,162 (Feb. 27, 2013).
Notice of Allowance and Fee(s) Due for U.S. Appl. No. 13/025,968 (Feb. 27, 2013).
Supplemental Notice of Allowability for U.S. Appl. No. 13/026,162 (Feb. 7, 2013).
Notice of Allowance and Fee(s) Due for U.S. Appl. No. 13/026,031 (Jan. 30, 2013).
Supplemental Notice of Allowability for U.S. Appl. No. 13/026,162 (Jan. 24, 2013).
Notice of Allowance and Fee(s) Due for U.S. Appl. No. 13/026,162 (Dec. 19, 2012).
Communication of European Publication Number and Information on the Application of Article 67(3) EPC for European Patent Application No. 11742923.3 (Nov. 21, 2012).
Communication of European Publication Number and Information on the Application of Article 67(3) EPC for European Patent Application No. 11742912.6 (Nov. 21, 2012).
Communication of European Publication Number and Information on the Application of Article 67(3) EPC for European Patent Application No. 11742909.2 (Nov. 21, 2012).
Communication of European Publication Number and Information on the Application of Article 67(3) EPC for European Patent Application No. 11742906.8 (Nov. 21, 2012).
Communication of European Publication Number and Information on the Application of Article 67(3) EPC for European Patent Application No. 11742905.0 (Nov. 21, 2012).
Communication of European Publication Number and Information on the Application of Article 67(3) EPC for European Patent Application No. 11742901.9 (Nov. 21, 2012).
Communication of European Publication Number and Information on the Application of Article 67(3) EPC for European Patent Application No. 11742894.6 (Nov. 21, 2012).
Final Official Action for U.S. Appl. No. 13/026,105 (Nov. 26, 2012).
Non-Final Official Action for U.S. Appl. No. 13/026,153 (Nov. 6, 2012).
Non-Final Official Action for U.S. Appl. No. 13/412,352 (Oct. 26, 2012).
Non-Final Official Action for U.S. Appl. No. 13/026,144 (Oct. 16, 2012).
Non-Final Official Action for U.S. Appl. No. 13/026,098 (Sep. 20, 2012).
Non-Final Official Action for U.S. Appl. No. 13/026,060 (Sep. 19, 2012).

(56) References Cited

OTHER PUBLICATIONS

Communication of European Publication Number and Information on the Application of Article 67(3) EPC for European Patent Application No. 11742921.7 (Sep. 12, 2012).
Non-Final Official Action for U.S. Appl. No. 13/026,081 (Sep. 12, 2012).
Non-Final Official Action for U.S. Appl. No. 13/026,112 (Aug. 29, 2012).
Communication of European publication number and information on the application of Article 67(3) EPC for European Application No. 10824243.9 (Jul. 25, 2012).
Notification of Transmittal of the International Search Report and the Written Opinion of the International Searching Authority, or the Declaration for International Patent Application No. PCT/US2012/027736 (Jun. 12, 2012).
Advisory Action for U.S. Appl. No. 12/906,816 (Jun. 5, 2012).
Applicant-Initiated Interview Summary for U.S. Appl. No. 12/906,816 (May 17, 2012).
Non-Final Official Action for U.S. Appl. No. 13/026,105 (May 16, 2012).
Traffix Systems, "Datasheet; Traffix Signaling Delivery Controller (SDC)," pp. 1-5 (May 2011).

* cited by examiner

PEER ROUTING TABLE (PRT) — 1202

| DEST-REALM | APPL ID | DEST-HOST | ACTION | ROUTE LIST NAME | PRI |
|---|---|---|---|---|---|
| VZW.COM | DON'T CARE | DON'T CARE | ROUTE TO PEER | ATT_NW | 1 |
| ATT.COM | DON'T CARE | DON'T CARE | ROUTE TO PEER | VZW_NW | 1 |
| MYNW.COM | 43 | DON'T CARE | ROUTE TO PEER | HSS1 | 1 |
| MYNW.COM | 65 | DON'T CARE | ROUTE TO PEER | MME2 | 1 |
| DON'T CARE | DON'T CARE | DON'T CARE | SEND ANSWER "X" | --- | 99 |

ROUTE LIST TABLE — 1204

| ROUTE LIST NAME | ROUTE NAME | PRI | WEIGHT |
|---|---|---|---|
| ATT_NW | ATT_PEER1 | 1 | 60 |
| ATT_NW | ATT_PEER2 | 1 | 40 |
| ATT_NW | ATT_PEER3 | 2 | 50 |
| ATT_NW | ATT_PEER4 | 2 | 50 |
| VZW_NW | VZW_PEER1 | 1 | 100 |
| VZW_NW | VZW_PEER2 | 2 | 100 |
| HHS1 | HSS1_SRV1 | 1 | 100 |
| MME1 | MME1_SRV1 | 1 | 100 |
| MME1 | MME1_SRV2 | 2 | 100 |

FIG. 12

| RULE # | DEST-REALM | APPL ID | DEST-HOST | ROUTE LIST NAME | ACTION | PRI |
|---|---|---|---|---|---|---|
| 1 | MYREALM.COM | 55 | DON'T CARE | APPL55 | ROUTE TO PEER | 1 |
| 2 | MYREALM.COM | 57 | DON'T CARE | APPL57 | ROUTE TO PEER | 1 |
| 3 | MYREALM.COM | DON'T CARE | DON'T CARE | NA | SEND ANSWER | 10 |
| 4 | DON'T CARE | DON'T CARE | DON'T CARE | NONLOCAL | ROUTE TO PEER | 99 |

| RULE # | DEST-REALM | APPL ID | DEST-HOST | ROUTE LIST NAME | ACTION | PRI |
|---|---|---|---|---|---|---|
| 1 | ABC.COM | DON'T CARE | DON'T CARE | ABC-REALM | ROUTE TO PEER | 1 |
| 2 | EFG.COM | DON'T CARE | DON'T CARE | EFG-REALM | ROUTE TO PEER | 1 |
| 3 | XYZ.COM | DON'T CARE | DON'T CARE | XYZ-REALM | ROUTE TO PEER | 1 |
| 4 | LOCAL.COM | 10 | HOST1.LOCAL.COM | LOCALHOST1 | ROUTE TO PEER | 1 |
| 5 | LOCAL.COM | 10 | HOST2.LOCAL.COM | LOCALHOST2 | ROUTE TO PEER | 1 |
| 6 | LOCAL.COM | 24 | HOST3.LOCAL.COM | LOCALHOST3 | ROUTE TO PEER | 1 |
| 7 | LOCAL.COM | 24 | HOST4.LOCAL.COM | LOCALHOST4 | ROUTE TO PEER | 1 |
| 8 | LOCAL.COM | DON'T CARE | DON'T CARE | NA | SEND ANSWER | 20 |
| 9 | DON'T CARE | DON'T CARE | DON'T CARE | ALLELSE | ROUTE TO PEER | 99 |

FIG. 14

| RULE # | DEST-REALM | APPL ID | DEST-HOST | ROUTE LIST NAME | ACTION | PRI |
|---|---|---|---|---|---|---|
| 1 | LOCAL.COM | 10 | HOST1.LOCAL.COM | LOCALHOST1 | ROUTE TO PEER | 1 |
| 2 | LOCAL.COM | 10 | HOST2.LOCAL.COM | LOCALHOST2 | ROUTE TO PEER | 1 |
| 3 | LOCAL.COM | 24 | HOST3.LOCAL.COM | LOCALHOST3 | ROUTE TO PEER | 1 |
| 4 | LOCAL.COM | 24 | HOST4.LOCAL.COM | LOCALHOST4 | ROUTE TO PEER | 1 |
| 5 | LOCAL.COM | 10 | HOST5.LOCAL.COM | LOCALHOST5 | ROUTE TO PEER | 1 |
| 6 | LOCAL.COM | 24 | HOST5.LOCAL.COM | LOCALHOST5 | ROUTE TO PEER | 1 |
| 7 | LOCAL.COM | DON'T CARE | HOST6.LOCAL.COM | LOCALHOST6 | ROUTE TO PEER | 1 |
| 8 | LOCAL.COM | DON'T CARE | DON'T CARE | LOADSHARERELAY | ROUTE TO PEER | 20 |

| USE CASE | ROUTE GROUP | | | | | | ROUTE GROUP'S WEIGHT |
|---|---|---|---|---|---|---|---|
| | ROUTE-1 | | ROUTE-2 | | ROUTE-3 | | |
| | WEIGHT | STATUS | WEIGHT | STATUS | WEIGHT | STATUS | |
| UC1 | 20 | AVAILABLE | 30 | AVAILABLE | 40 | AVAILABLE | 90 (20+30+40) |
| UC2 | 20 | AVAILABLE | 30 | UNAVAILABLE | 40 | AVAILABLE | 60 (20+40) |
| UC3 | 20 | UNAVAILABLE | 30 | UNAVAILABLE | 40 | UNAVAILABLE | 0 |

FIG. 16

| | | ROUTE LIST COMPRISED OF ROUTE GROUPS 1, 2, & 3, MINIMUM CAPACITY = 75 | | | | | | | | |
|---|---|---|---|---|---|---|---|---|---|---|
| | | ROUTE GROUP-1 | | | ROUTE GROUP-2 | | | ROUTE GROUP-3 | | ACTIVE ROUTE GROUP | ROUTE LIST STATUS |
| USE CASE | PRI | CAPACITY | STATUS | PRI | CAPACITY | STATUS | PRI | CAPACITY | STATUS | | |
| UC1 | 1 | 80 | AVAILABLE | 2 | 95 | AVAILABLE | 3 | 85 | AVAILABLE | RS-1 | AVAILABLE |
| UC2 | 1 | 80 | AVAILABLE | 2 | 100 | AVAILABLE | 3 | 110 | AVAILABLE | RS-1 | AVAILABLE |
| UC3 | 1 | 60 | DEGRADED | 2 | 50 | DEGRADED | 3 | 90 | AVAILABLE | RS-3 | AVAILABLE |
| UC4 | 1 | 60 | DEGRADED | 2 | 80 | AVAILABLE | 3 | 90 | AVAILABLE | RS-2 | AVAILABLE |
| UC5 | 1 | 60 | DEGRADED | 2 | 50 | DEGRADED | 3 | 70 | DEGRADED | RS-3 | DEGRADED |
| UC6 | 1 | 60 | DEGRADED | | | | | | | RS-1 | DEGRADED |
| UC7 | 1 | 0 | UNAVAILABLE | | | | | | | NONE | UNAVAILABLE |

METHODS, SYSTEMS, AND COMPUTER READABLE MEDIA FOR PROVIDING PEER ROUTING AT A DIAMETER NODE

PRIORITY CLAIM

This application claims the benefit of U.S. Provisional Patent Application Ser. No. 61/304,310 filed Feb. 12, 2010 and U.S. Provisional Patent Application Ser. No. 61/373,636 filed Aug. 13, 2010; the disclosures of which are incorporated herein by reference in their entireties.

STATEMENT OF INCORPORATION BY REFERENCE

The disclosures of each of the following commonly-owned, co-pending U.S. patent applications filed on Feb. 11, 2011 are hereby incorporated herein by reference in their entireties:

"Methods, Systems, And Computer Readable Media for Inter-Diameter-Message Processor Routing," (Ser. No. 13/025,968);

"Methods, Systems, And Computer Readable Media For Source Peer Capacity-Based Diameter Load Sharing" (Ser. No. 13/026,031);

"Methods, Systems, And Computer Readable Media For Inter-Message Processor Status Sharing," (Ser. No. 13/026,105);

"Methods, Systems, And Computer Readable Media For Providing Priority Routing At A Diameter Node," (Ser. No. 13/026,060);

"Methods, Systems, And Computer Readable Media For Providing Origin Routing At A Diameter Node," (Ser. No. 13/026,081);

"Methods, Systems, And Computer Readable Media For Providing Local Application Routing At A Diameter Node," (Ser. No. 13/026,098);

"Methods, Systems, And Computer Readable Media For Answer-Based Routing Of Diameter Request Messages," (Ser. No. 13/026,112);

"Methods, Systems, And Computer Readable Media For Performing Diameter Answer Message-Based Network Management At A Diameter Signaling Router (DSR)," (Ser. No. 13/026,125);

"Methods, Systems, And Computer Readable Media For Multi-Interface Monitoring And Correlation Of Diameter Signaling Information," (Ser. No. 13/026,133);

"Methods, Systems, And Computer Readable Media For Diameter Protocol Harmonization," (Ser. No. 13/026,144);

"Methods, Systems, And Computer Readable Media For Diameter Network Management," (Ser. No. 13/026,153); and "Methods, Systems, And Computer Readable Media For Diameter Application Loop Prevention," (Ser. No. 13/026,162).

TECHNICAL FIELD

The subject matter described herein relates to performing routing at a Diameter node. More specifically, the subject matter relates to methods, systems, and computer readable media for providing peer routing at a Diameter node.

BACKGROUND

Diameter is an authentication, authorization and accounting (AAA) protocol for computer networks, and is a successor to RADIUS. The Diameter base protocol is defined in IETF RFC 3588, the disclosure of which is incorporated by reference herein in its entirety. RFC 3588 discusses a Diameter routing agent that routes Diameter signaling messages, but does not specify architecture for the Diameter routing agent or Diameter routing in general.

Accordingly, in light of these difficulties, a need exists for improved methods, systems, and computer readable media for providing peer routing at a Diameter node.

SUMMARY

Methods, systems, and computer readable media for providing peer routing at a Diameter node are disclosed. One exemplary method includes receiving, at an ingress Diameter message processor associated with a DSR, a Diameter message from a first Diameter node. The method further includes accessing, using the ingress Diameter message processor, Diameter peer routing information to determine an egress Diameter message processor among a plurality of egress Diameter message processors within the DSR and associated with a second Diameter node that is a peer of the DSR and to which the Diameter message is to be forwarded. The method also includes forwarding the Diameter message to the determined egress Diameter message processor.

As used herein, the term "node" refers to a physical computing platform including one or more processors and associated memory.

The subject matter described herein may be implemented in software in combination with hardware and/or firmware. For example, the subject matter described herein may be implemented in software executed by a processor. In one exemplary implementation, the subject matter described herein for providing peer routing at a Diameter node may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which:

FIG. 12 is a block diagram illustrating an exemplary peer routing table (PRT) and a related Route List Table according to an embodiment of the subject matter described herein;

FIG. 13 is a block diagram illustrating an exemplary peer routing table that utilizes default entries according to an embodiment of the subject matter described herein;

FIG. 14 is a block diagram illustrating another exemplary peer routing table that utilizes default entries according to an embodiment of the subject matter described herein;

FIG. 15 is a block diagram illustrating yet another exemplary peer routing table that utilizes default entries according to an embodiment of the subject matter described herein;

FIG. 16 is a block diagram illustrating an exemplary route list table that provides route list capacities for each table entry according to an embodiment of the subject matter described herein;

FIG. 17 is a block diagram illustrating an exemplary route list table that provides route list availability data for each table entry according to an embodiment of the subject matter described herein.

DETAILED DESCRIPTION

The subject matter described herein includes methods, systems, and computer readable media for providing peer routing at a Diameter node. Specifically, the present subject matter described herein may be implemented at a Diameter signaling router (DSR) network element (NE) including a Diameter connection layer (DCL), Diameter routing layer (DRL), one or more local applications, and one or more routing tables, such as a peer routing table (PRT) and application routing table (ART). In one embodiment, a DSR includes a set of co-located DSR MPs that share common Diameter routing tables. As used herein, the term "Diameter connection layer (DCL)" refers to a software layer of a Diameter stack in the DSR that implements Diameter transport connections. As used herein, the term "Diameter routing layer (DRL)" refers to a software layer of the Diameter stack which implements Diameter routing. Exemplary DRL capabilities may include: routing request messages to Diameter peer nodes or local applications based on message content, discarding or rejecting Diameter request messages based on message content rules, peer congestion control, and easier configuration. In order to support both application processing and core Diameter routing functions, the DRL in the DSR may support the following message routing tables: an application routing table (ART) and a peer routing table (PRT), each of which will be described in greater detail later. It will be appreciated that embodiments of the present may be implemented in any node that is adapted to route Diameter messages, including but not limited to, a Diameter routing agent, a Diameter proxy agent, a Diameter relay agent, or a Diameter translation agent.

Figure 1:
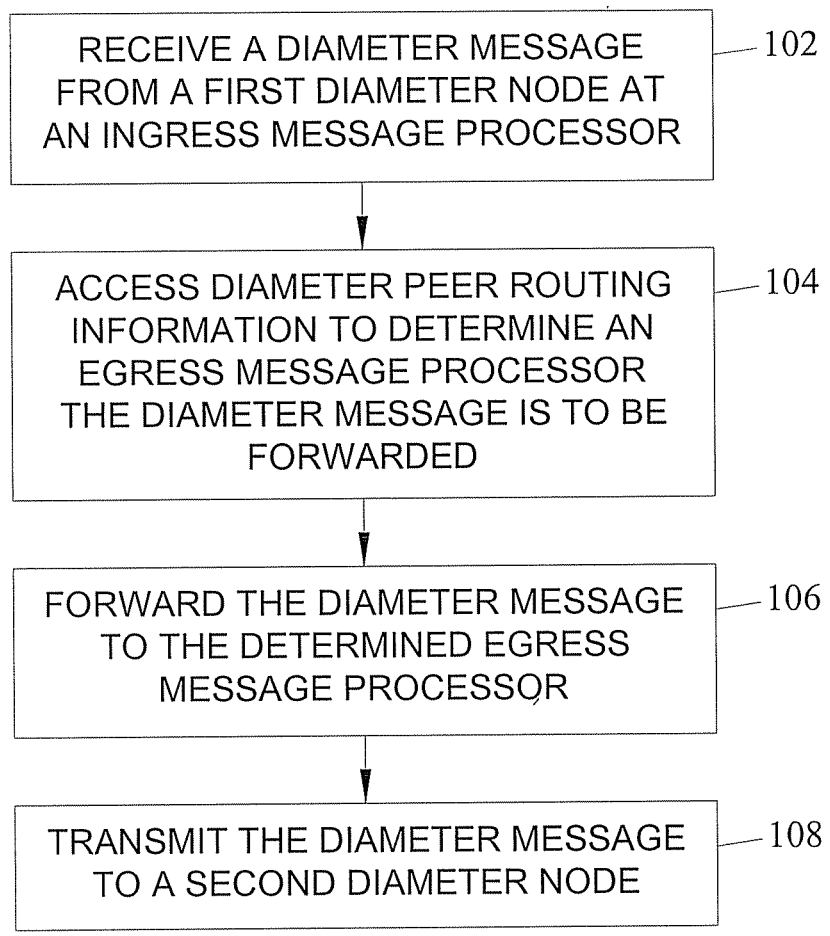
FIG. 1 is a flow chart illustrating a process for providing peer routing at a Diameter signaling router (DSR) according to an embodiment of the subject matter described herein.

FIG. 1 is a flow chart of a method 100 for providing peer routing at a DSR according to an embodiment of the subject matter described herein. Referring to FIG. 1, in block 102, a Diameter message is received, at an ingress Diameter message processor (MP) associated with a DSR, from a Diameter peer node. For example, a DSR located in a path between a Diameter client (i.e., a first Diameter peer node) and a Diameter server (i.e., a second Diameter peer node) may receive a Diameter Request message directed to the server from the client at the DSR's ingress Diameter message processor.

In block 104, at the ingress Diameter message processor, a PRT is accessed to determine an egress Diameter message processor among a plurality of egress Diameter message processors associated with the DSR the Diameter message is to be forwarded. In one embodiment, the DRL may extract a set of parameter values from the received Diameter message which may be used as criteria for Diameter message matching in a PRT. Alternatively, the received Diameter message may be first processed by a local Diameter signaling application on the DSR prior to the extraction of the parameter values. Exemplary parameters (i.e., rule message selection parameters) found in a Diameter message may include 1) a Destination-Realm parameter, 2) an Application ID parameter, 3) a Destination-Host parameter, 4) a Origin-Realm parameter, which identifies the realm from which the message was originated, 5) an Origin-Host parameter that identifies the Host from which the message was originated, 6) a User-Name parameter that identifies the user for which this service is being invoked, and 7) a Command-Code parameter that identifies the request message type.

The extracted parameter values may be used by the DRL to search Diameter peer routing information stored in one or more local peer routing tables on the DSR. If the parameter values match at least one rule entry in the peer routing table, then the matching entry with the highest priority value is selected. An "Action" parameter from the selected rule entry from the PRT is then inspected. If the Action indicates "Route to Peer", then the DRL invokes a route selection process based on the rule's Route List. The route selection process involves creating a list of available routes with the Route List's designated Active Route Group. The DSR then selects a route from the list based on, for example, a statistical algorithm (see details below). Consequently, the route selected from the list is associated with a particular egress Diameter message processor on the DSR.

In block 106, the Diameter message is forwarded to the determined egress Diameter message processor. In one embodiment, the DRL on the ingress Diameter message processor forwards the Diameter message to the DRL on the selected egress Diameter message processor. The DRL on the egress Diameter message processor, in turn, forwards the Diameter message to a local DCL queue for transport.

In block 108, the Diameter message is transmitted from the determined egress Diameter message processor to a second Diameter node. In one embodiment, the DCL on the egress Diameter message processor forwards the processed Diameter message from the DSR to the intended Diameter peer node over a Diameter connection. Notably, this step is conducted without performing any routing-related processing by the egress Diameter message processor itself. The route and peer node selection is conducted entirely by the ingress Diameter message processor on the DSR.

There are several exemplary architecture options in which may be employed by a DSR. A first architecture option may include where each message processor (MP) supports a full Diameter stack that includes the DCL, DRL, and Application layers. A second architecture option may include a DCL that runs on dedicated MPs, Routing and Application layers can either be combined on dedicated MPs or have dedicated MPs for each layer. A third architecture option may include a Diameter stack (DCL, DRL) that runs on dedicated MPs, local Diameter applications run on separate dedicated MPs. Each of these exemplary architecture options are described in greater detail below with respect to FIGS. 2, 3, and 4.

Figure 2:
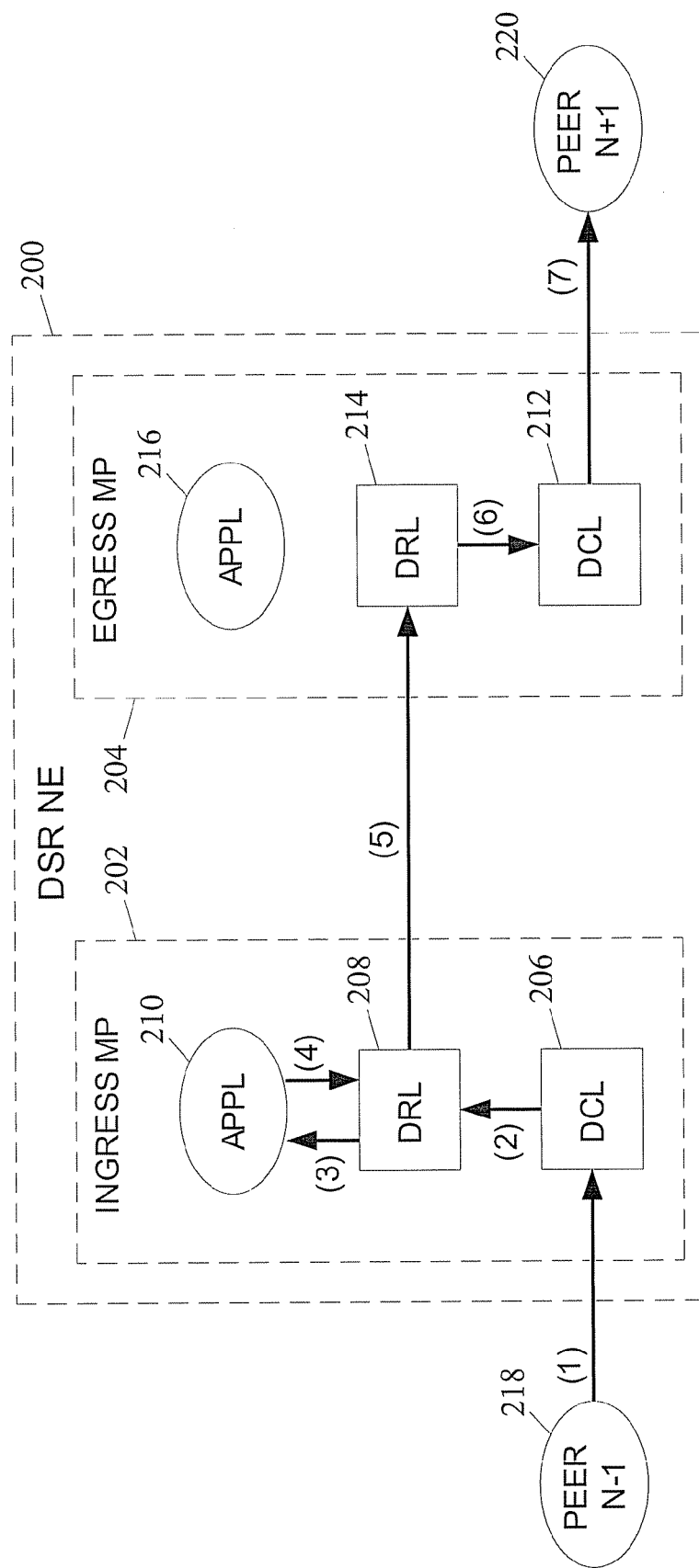
FIG. 2 is a block diagram illustrating an exemplary software architecture including a full stack per MP for providing local application routing at a Diameter node according to an embodiment of the subject matter described herein.

FIG. 2 is a block diagram illustrating an exemplary architecture including a full stack per MP for providing peer routing at a DSR according to an embodiment of the subject matter described herein. Referring to FIG. 2, DSR network element (NE) 200 may include an ingress MP 202 for receiving Diameter messages from Diameter peer nodes and an egress MP 204 for transmitting Diameter messages to Diameter peer nodes. Ingress MP 202 and egress MP 204 may each include a DCL, DRL, and one or more signaling applications (residing in the application layer). For example, ingress MP 202 may include a DCL 206, a DRL 208, and a signaling application 210. Likewise, egress MP 204 may include a DCL 212, a DRL 214, and a signaling application 216. In order to facilitate communications between ingress MP 202 and egress MP 204, DRL 208 of ingress MP 202 may be operable to communicate with DRL 214 of egress MP 204. Additionally, DRLs 208 and 214 may each be operable to communicate with DCLs 206 and 212 and applications 210 and 216, respectively.

In an exemplary Diameter message routing scenario, Diameter peer node N−1 218 may send a Diameter message to DSR 200. The Diameter message may be received by DCL 206 of ingress MP 202. In one embodiment, the received Diameter message is a Diameter request message. Ingress messages may be processed completely on ingress MP 202 including the selection of a destination Diameter peer node for the Diameter message by DRL 208. Continuing with the above example, DRL 208 may receive a Diameter message passed by DCL 206.

If local application processing is required, ingress DRL 208 may forward the Diameter message to an appropriate local application. For example, DRL 208 may forward the Diameter message to local application 210, which processes the message and returns the message to DRL 208. It is appreciated that an application distribution function may not be required.

Figure 3:
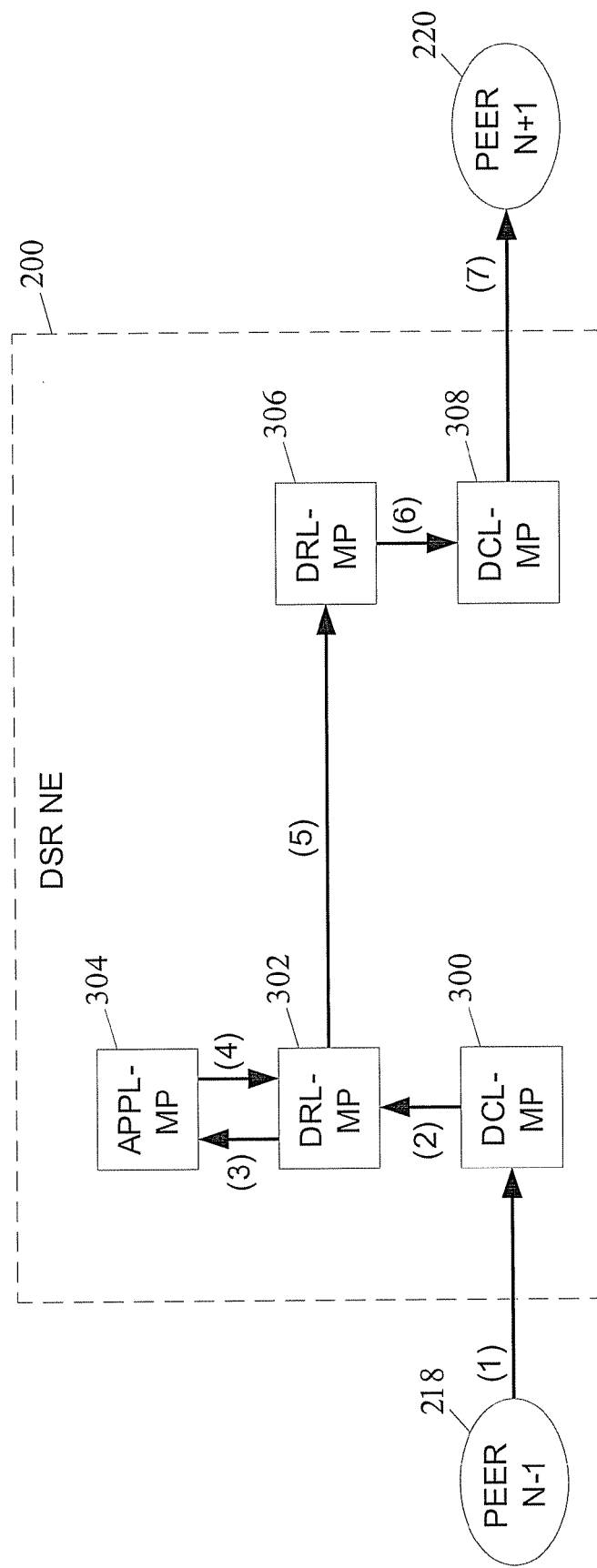
FIG. 3 is a block diagram illustrating an exemplary architecture including dedicated DCL MPs for providing local application routing at a Diameter node according to an embodiment of the subject matter described herein.

Next, ingress DRL 208 may forward the Diameter message to egress DRL 214 for forwarding to the local queue associated with DCL 212. Egress DCL 212 may then transmit the Diameter message to Diameter peer node N+1 220. FIG. 3 is a block diagram illustrating an exemplary architecture including dedicated DCL MPs for providing peer routing at a DSR according to an embodiment of the subject matter described herein. In contrast to the full stack-per MP embodiment shown in FIG. 2, the embodiment shown in FIG. 3 includes dedicated MPs for the DCLs, as well as dedicated MPs for the DRLs and local applications. Referring to FIG. 3, DSR 200 may include DCL-MP 300 for receiving Diameter messages from peers and DCL-MP 308 for transmitting Diameter messages to peers. Similarly, DSR 200 may include DRL-MP 302 and DRL-MP 306 for receiving Diameter messages from Diameter peer nodes and for transmitting Diameter messages to Diameter peer nodes. In contrast to a full stack-per MP embodiment (see FIG. 2), application-MP 304 may be associated with DRL-MP 302 and may not have a corollary associated with DRL-MP 306. DRL-MPs 302 and 306 may each be operable to communicate with one another.

In an exemplary Diameter message routing scenario analogous to the one described above with respect to FIG. 2, ingress Diameter messages may be received by DCL-MP 300, which may distribute the Diameter messages (e.g., a Diameter request messages) to DRL-MPs based on various factors including, but not limited to, the availability, transactions per second (TPS) capacity and congestion status of DRL-MP 302 as compared with other DRL-MPs (not shown in their entirety). In one embodiment, DRL-MP 302 may determine whether signaling application processing required. If application processing is required, ingress DRL-MP 302 may forward the Request message to Appl-MP 304 (also based on its availability, TPS capacity and congestion status).

In one embodiment, ingress DRL-MP 302 may then select a destination peer and route for the Diameter message using a peer routing table (not shown) and ingress DRL-MP 302 may forward the message to egress DRL-MP 306 based on the route selection process. Egress DRL-MP 306 may then forward the Diameter message to egress DCL-MP 308 (for delivery to Diameter peer node N+1 220 as selected by ingress DRL-MP 302.

Figure 4A:
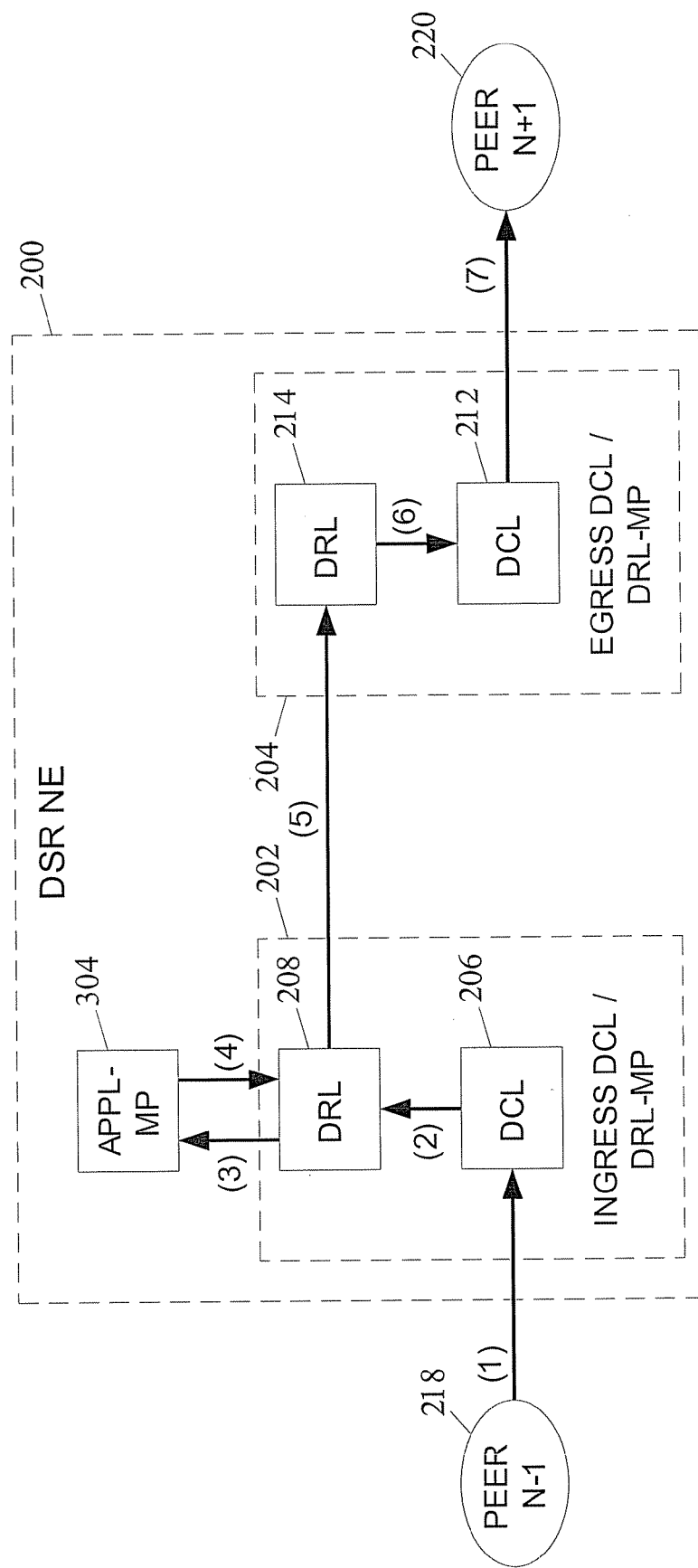
FIG. 4A is a block diagram illustrating an exemplary architecture including dedicated DCL/DRL and application MPs for providing local application routing at a Diameter node according to an embodiment of the subject matter described herein.

FIG. 4A is a diagram illustrating an exemplary architecture including dedicated DCL/DRL MPs and application MPs for providing local application routing at a DSR according to an embodiment of the subject matter described herein. FIG. 4A represents a hybrid approach between the full stack per MP of FIG. 2 and the dedicated DCL/DRL/application-MPs of FIG. 3. Referring to FIG. 4, in an exemplary Diameter message routing scenario, Diameter peer node N−1 218 may send a Diameter message to DSR 200. The Diameter message may be received by DCL 206 of ingress MP 202. Ingress Diameter messages may be processed completely on ingress MP 202 including the selection of a destination Diameter peer node for the Diameter message by DRL 208. DCL 206 may then pass the Diameter message to DRL 208.

If signaling application processing is required, ingress DRL 208 may forward the Diameter message to local signaling application(s). For example, DRL 208 may forward the Diameter message to local application 304, which may process the message and return the message to DRL 208. Afterwards, ingress DRL 208 may forward the Diameter message to egress DRL 214 for forwarding to the local queue associated with DCL 212. Egress DCL 212 may then transmit the Diameter message to Diameter peer node N+1 220.

Figure 4B:
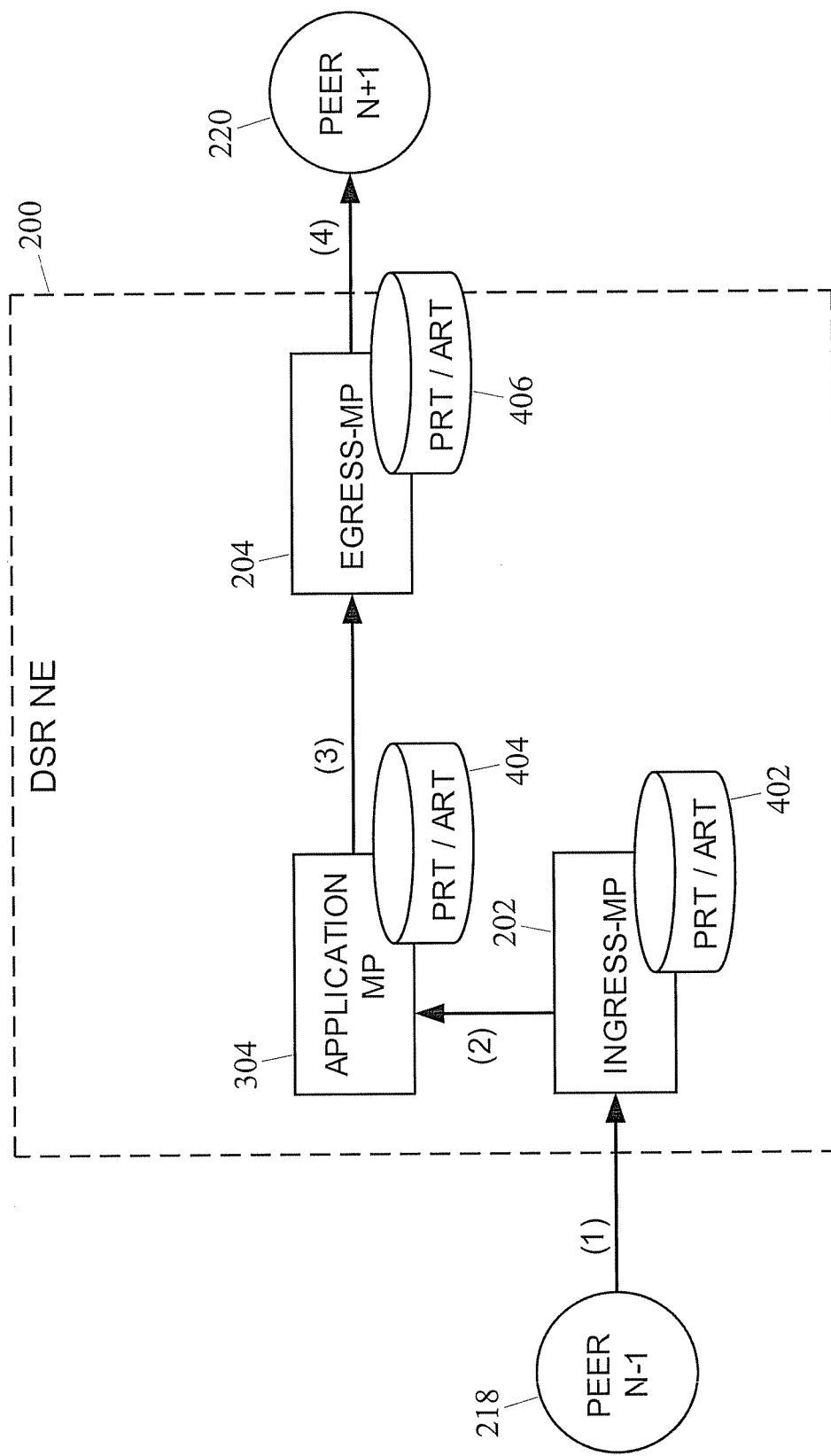
FIG. 4B is a block diagram illustrating an exemplary architecture including an application MP that utilizes a local peer routing table according to an embodiment of the subject matter described herein.

FIG. 4B is a block diagram illustrating an exemplary Diameter signaling router (DSR) 200 that is communicatively connected to a Diameter peer node 218 and a Diameter peer node 220. In one embodiment, DSR 200 includes an ingress message processor (MP) 202, an application MP 304, and an egress MP 204. Each of ingress MP 202, application MP 304, and egress MP 204 may be provisioned with one or more memories for storing a peer routing table and/or application routing table (e.g., PRT/ARTs 402-406). One embodiment of the present subject matter may pertain to maintaining a PRT/ART (e.g., PRT/ART 110) on a DSR MP that is configured to host an application. For example, the DSR MP may be an MP that is not directly connected to any external Diameter peer nodes.

As shown in FIG. 4B, ingress MP 202 receives a Diameter request message from peer node 218. In one embodiment, ingress MP 202 may utilize an associated Diameter connection layer (DCL) message processor (not shown) to receive the Diameter message, which may then be forwarded to an associated Diameter routing layer (DRL) message processor (not shown). For example, the DCL MP and DRL MP may be local or components of ingress MP 202. In one embodiment, the DRL MP in ingress MP 202 may then be used to forward the Diameter request message to application MP 304. In some implementations (e.g., as shown in FIG. 4), application MP 304 sends the Diameter message back to ingress MP 202 for Diameter Routing Layer processing (e.g., to determine the appropriate egress MP the Diameter request message is to be forwarded to). In this embodiment, however, application MP 304 is provisioned with a local PRT/ART 404. Notably, application MP 304 may process the received Diameter message and may subsequently consult the local PRT/ART 404 to determine the appropriate egress MP associated with the DSR element. Afterwards, application MP 304 may forward the processed Diameter message directly to the determined egress MP (e.g., egress MP 204). In one embodiment, egress MP 204 may include a DRL MP and a DCL MP (not shown), which may be used to process and forward the Diameter message upstream towards peer node 220.

By eliminating the need for application MP 304 to communicate messages back towards ingress MP 202 (i.e., returning the Diameter message back to ingress MP 202 for DRL processing), the routing efficiency of Diameter messages within DSR 200 can be improved. Namely, switch transit times and other latency generating factors typically experienced in a DSR element or routing agent may be reduced or eliminated.

Figure 5:
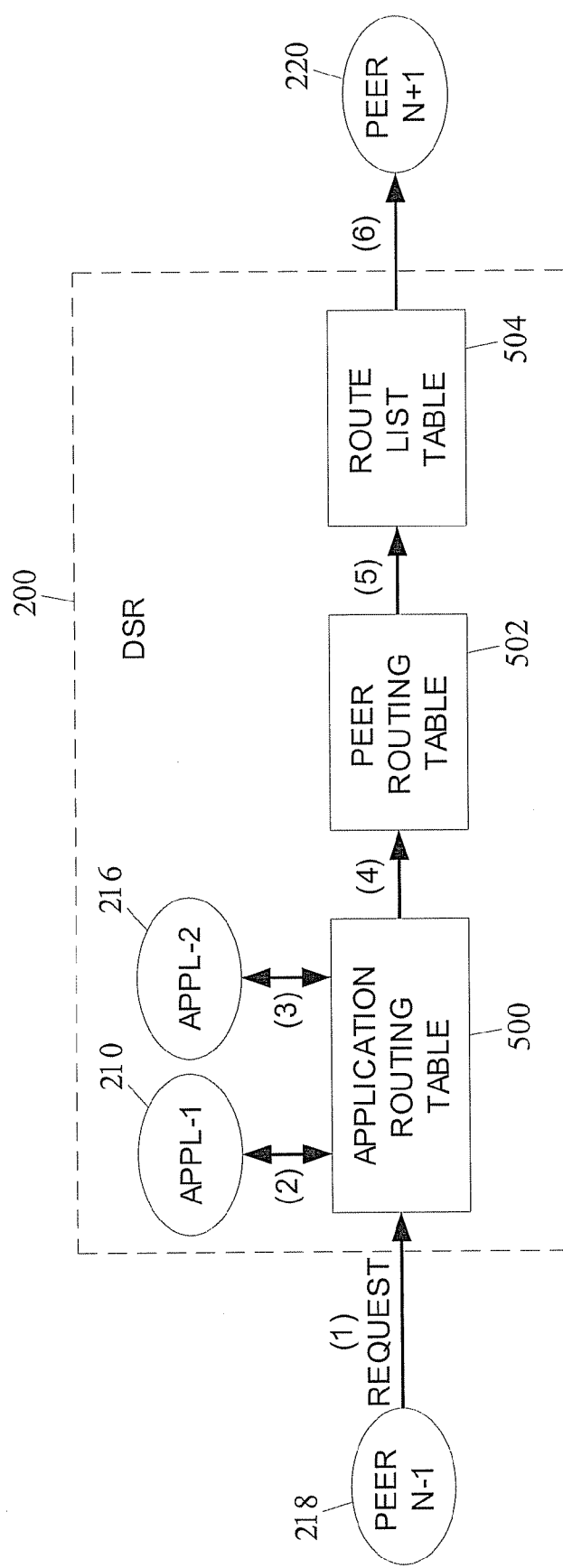
FIG. 5 is a block diagram illustrating an exemplary high level message routing flow for providing local application routing at a Diameter node according to an embodiment of the subject matter described herein.

FIG. 5 is a block diagram illustrating an exemplary high level message routing flow for providing peer routing at a DSR according to an embodiment of the subject matter described herein. Referring to FIG. 5, Diameter peer node N-1 218 may send a Diameter request message to DSR 200. In one embodiment, DSR 200 may optionally consult ART 500 in order to determine whether processing of the Diameter message by a Diameter signaling application is needed. If the message content matches an ART rule, the message is forwarded to the identified application for processing. The searching process may continue iteratively until no additional rule matches are found. For example, ART 500 may forward the message to application 210 for processing and, after the Diameter message is returned to ART 500, the message may then be forwarded to application 216 for processing.

After application processing is completed in DSR 200, ART 500 may forward the message to Peer Routing Table (PRT) 502. In one embodiment, PRT 502 may be searched after ART 500 searching is completed such that if the message content (after application processing updates) matches a rule in PRT 502, the message may be routed to a Diameter peer node as defined by a Route List in route list table 504 associated with the rule. Thus, the message may be sent to Diameter peer N+1 220 after route list table 504 is consulted.

By using a single DSR configuration as described above, redundant DRL routing on both the ingress and egress MPs may be eliminated. For example, the ingress MP may be configured to receive a Diameter message from a first Diameter peer node and be responsible for conducting ART and PRT searches and a route selection process. The ingress MP would select a route from the Active Route Group and forward both the Diameter message received from a sending Diameter peer node and the selected route to the egress DSR MP that controls the Diameter peer connection. Notably, when the egress MP on the DSR receives a Diameter request message from an ingress MP containing a route, the egress MP will bypass local ART and PRT process described above and attempt to deliver the message to the Diameter peer node selected by the ingress MP.

Figure 6:
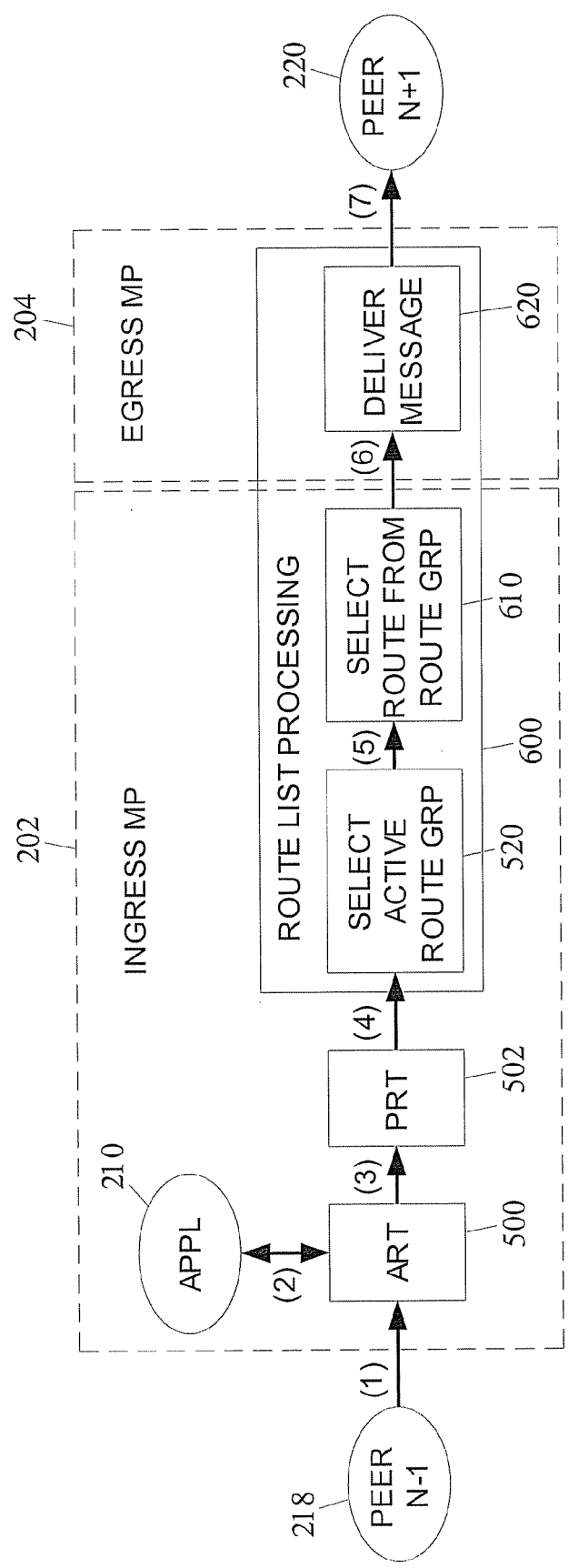
FIG. 6 is a block diagram illustrating an exemplary scalable DSR NE including functional partitioning for providing local application routing at a Diameter node according to an embodiment of the subject matter described herein.

This is aspect is depicted in FIG. 6, which is a block diagram illustrating an exemplary scalable DSR including functional partitioning for providing peer routing according to an embodiment of the subject matter described herein. Referring to FIG. 6, the ingress MP 202 and egress MP 204 are utilized to perform steps associated with route list processing 700. In one embodiment, ingress MP 202 is configured to conduct the selection of the Active Route Group step (step 520) and the selection of a route from the route group step (step 610). Specifically, ART 500, local application 210, PRT 502, and the selection of a route group step 520 and the selection of a route from the route group step (step 610) of route list processing 700 may be associated with ingress MP 202. Likewise, the Diameter message delivery step (step 620) of route list processing 700 may be associated with egress MP 204. If egress MP 204 cannot route the message (e.g., the Diameter peer node is unavailable), egress MP 204 will send a response to ingress MP 202. In response, ingress MP 202 may then select a next viable route from the Active Route Group.

In one embodiment, the inter-MP Diameter message routing with the scalable DSR may be optimized. In order to minimize overhead associated with inter-MP routing of Diameter messages, the overhead of Diameter messages on inter-MP links should be avoided. Namely, forwarding a Diameter request message from the ingress MP to the egress MP may involve the ingress DRL creating a new Hop-by-Hop identifier for the request message directed toward the egress MP. Specifically, the ingress DRL may insert a MP identifier into the Hop-by-Hop identifier, which allows an egress DRL to back-route a Diameter answer response message to a ingress DRL. If the egress DRL happens to encounter an error (e.g., the failure of the second Diameter peer node, the transport queue is full, etc.), the egress DRL may send an error response (with a cause code) to the ingress DRL. In one embodiment, the error response may include either a Diameter answer message or an internal message.

In one embodiment, egress-to-ingress MP Diameter answer messages may be forwarded upon the egress DRL validating the embedded MP identifier in the Diameter answer message's Hop-by-Hop identifier. If the MP identifier is valid and the MP is available, the egress DRL internally routes the Diameter answer message to the ingress DRL for Diameter back-routing processing. If either the MP identifier is invalid or the MP is unavailable, then the egress DRL may discard the Diameter answer message received from a second Diameter peer node. Notably, any Diameter answer messages received by the Ingress DRL from an egress DRL may be processed as if the Diameter message has been received directly from the second Diameter peer node.

Figure 7:
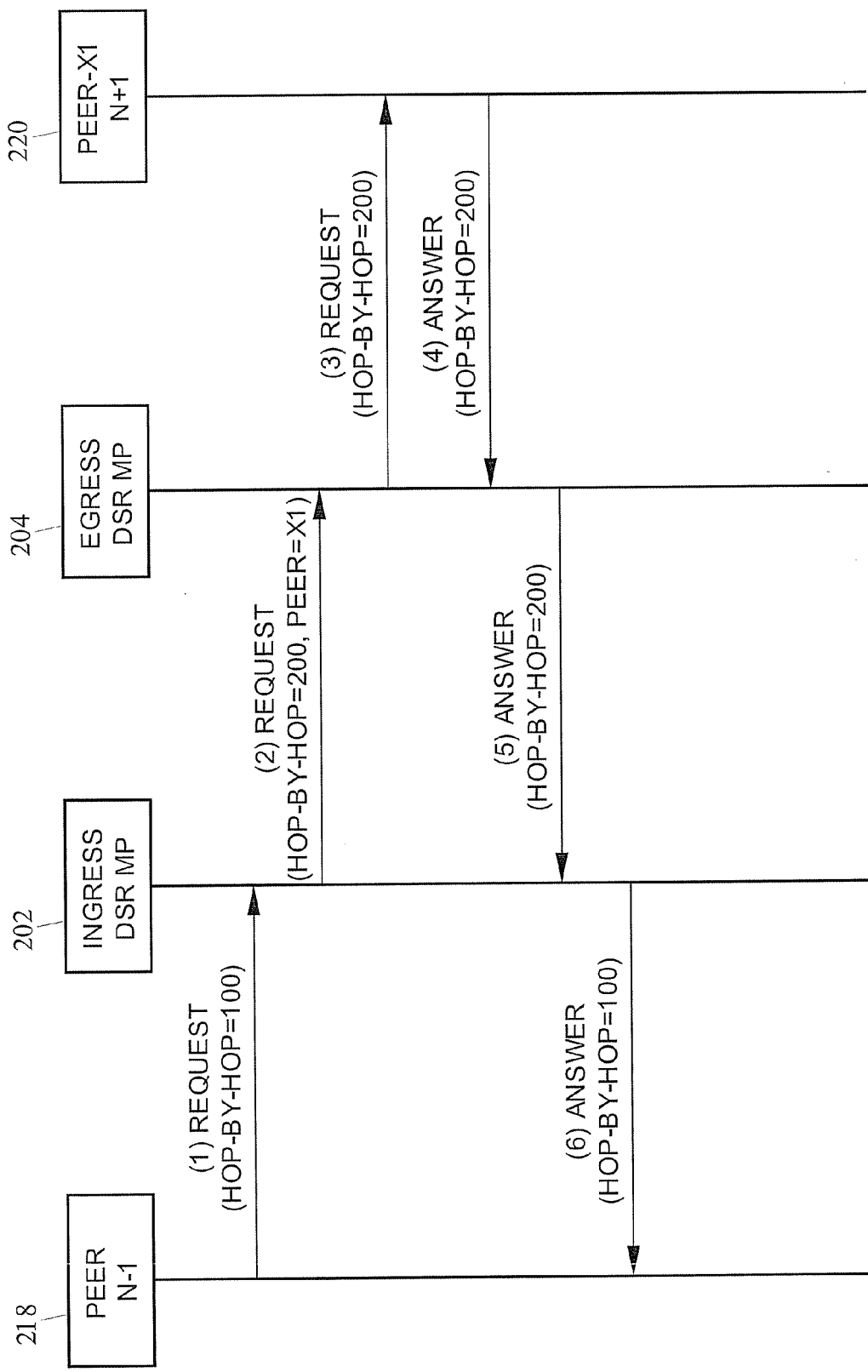
FIG. 7 is a message sequence diagram illustrating normal inter-message processor routing according to an embodiment of the subject matter described herein.

FIG. 7 is an exemplary Diameter signaling flow diagram illustrating inter-MP routing according to an embodiment of the subject matter described herein. Diameter peer node 218 is depicted as sending a Diameter request message, which includes a Hop-by-Hop identifier that is equal to 100, to ingress MP 202 in a DSR. Ingress MP 202 may then use the Diameter request message, whose parameters match a PRT rule with an Action of "Route to Peer". Ingress MP 202 may then select the first route from the Route List's Active Route Group (which is indicated by a priority identifier), create a new Hop-by-Hop ID containing the MP identifier of the ingress MP (e.g., ID=200), and forward the Diameter message to the egress MP's DCL layer that controls the connection to Diameter peer node 220. When egress DSR MP 204 receives a request message from ingress MP 202 containing a route, egress MP 204 may bypass DRL processing and attempt to queue the Diameter request message to the Diameter peer node 220 (i.e., the peer node selected by ingress MP 202) unmodified. Egress MP 204 then sends the Diameter request message to the Diameter peer node indicated in the Diameter request message (e.g., "Peer=X1"). After receiving the Diameter request message, Diameter peer node 220 responds by transmitting a Diameter answer message with Hop-by-Hop identifier=200 to egress MP 204. When egress MP 204 receives the Diameter answer message from Diameter peer node 220, egress MP 204 routes the message to the MP identified in the Hop-by-Hop ID (i.e., ingress MP 202). Upon receiving the Diameter message, ingress MP 202 modifies the Hop-by-Hop ID from "200" to "100" and forwards the message to Diameter peer node 218 to complete the back tracking process. Notably, the Diameter answer message sent by Diameter peer node 220 to Diameter peer node 218 traverses through the same "path" of egress and ingress message processors that were utilized to transmit the Diameter request message from Diameter peer node 218 to Diameter peer node 220. In one embodiment, each of the ingress and egress message processors maintains state information associated with the Diameter session or connection. In another embodiment, the ingress and egress message processors may use and modify the Hop-by-Hop identifiers in the Diameter messages to ensure that the entire Diameter request-answer communication transaction is handled by the same ingress and egress message processors. For example, in the DSR, the ingress MP (MP1) may receive a Diameter message, M1, on a connection C10, with a hop-by-hop ID=250. The ingress MP may then select an egress MP (MP2), on a connection C20, and generate a new hop-by-hop-ID=01000231. Notably, MP1 generates a hop-by-hop ID that encodes the ingress MP into the hop-by-hop ID. For example, the hop-by-hop ID is 32 bits: 8 bits which encode the ingress MP's address and 24 bits which are an increasing counter starting from 0. Every egress MP that receives an Answer message from a peer diameter node can forward the Answer message to the original ingress MP. This is because the peer is configured to return an Answer message using the original hop-by-hop ID. The egress MP can access the 8 bits where the original ingress MP's address was encoded. Also, the egress MP may forward the Answer message to the ingress MR The egress MP identifies itself (MP2) and the connection it received the Answer message on (C20) when it forwards the Answer message. Furthermore, the ingress MP may use the connection ID and the 24-bit sequence number as a KEY to lookup the original ingress Request message. For example, the KEY=C20+000231 where the result is Connection C10 and the message with hop-by-hop ID=250.

In an alternate embodiment, where multiple Diameter message processors may be associated with or service the same Diameter peer connection, the present subject matter allows for the ingress MP that receives a Diameter answer message to select an egress MP that is different from the MP that received the associated Diameter request message. As such, in the event that an MP which served as the ingress MP for a Diameter request message fails (or becomes unavailable) prior to receipt at the DSR of an associated answer message, the Diameter answer message may be internally routed by the ingress MP to an egress MP that is different from the failed MP.

Figure 8:
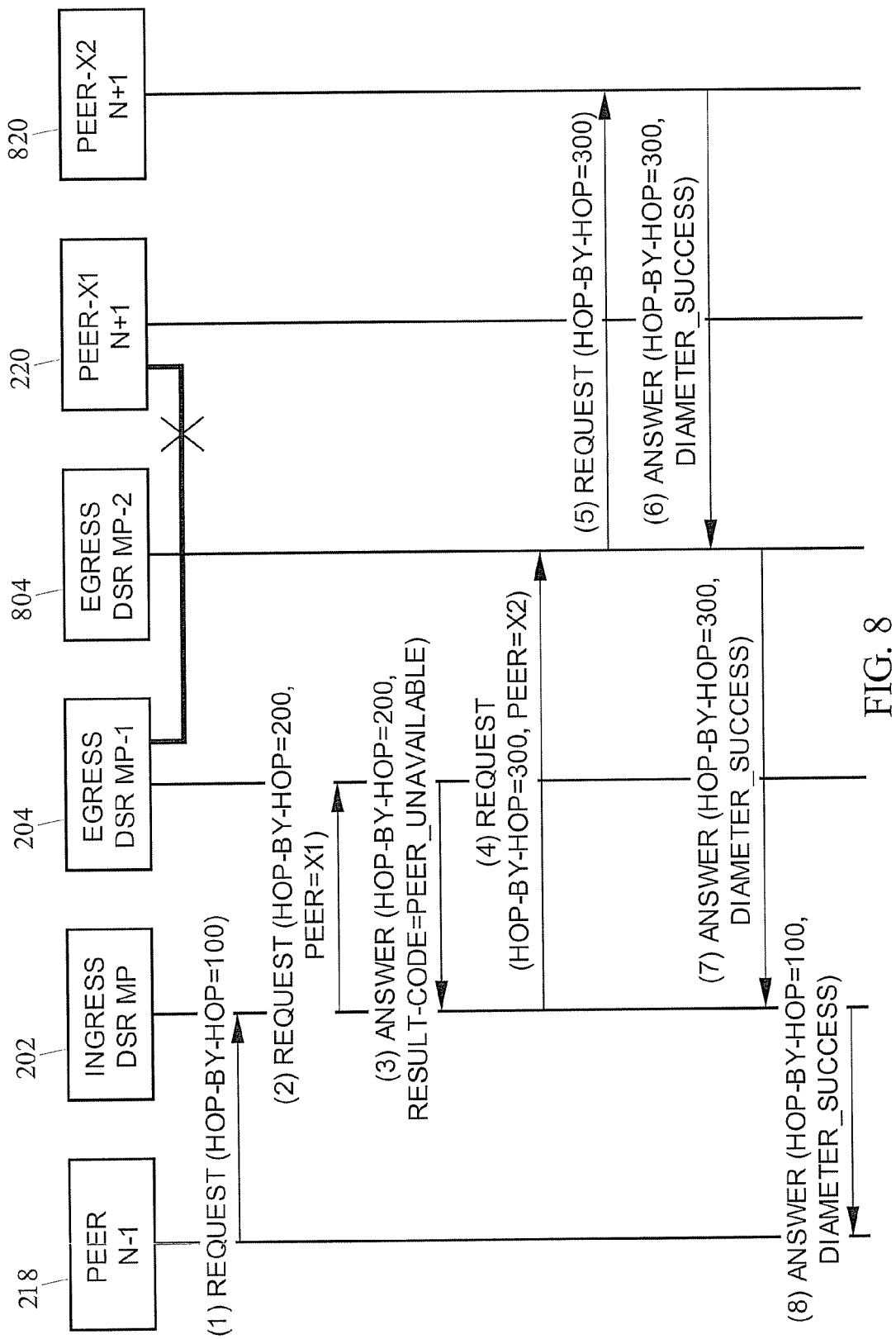
FIG. 8 is a message sequence diagram illustrating an initial routing attempt rejected by an egress message processor due to the unavailability of a Diameter peer node according to an embodiment of the subject matter described herein.

FIG. 8 is an exemplary signaling flow diagram illustrating a first routing attempt rejected by an egress MP due to the unavailability of a Diameter peer node according to an embodiment of the subject matter described herein. Diameter peer node 218 is depicted as sending a Diameter request message, which includes a Hop-by-Hop identifier that is equal to 100 (which identifies peer node 218), to ingress MP 202 in a DSR. Ingress MP 202 searches ART and the PRT (not shown) in order to determine if the parameters in the Diameter request message matches a PRT rule "Route to Peer" which is then paired with a Route List Name. Ingress MP 202 may then select the first route from the Route List's Active Route Group (e.g., Peer=X1 via egress MP 204) whose current status on the ingress MP is "Available". Ingress MP 202 may then create a new Hop-by-Hop identifier containing its MP identifier and subsequently forward the request message to egress MP 204 along with the selected route (Peer=X1). In this particular scenario, Diameter peer node 220 is indicated as being "Unavailable" on egress MP 204 and egress MP 204 rejects the Diameter request message. Thus, routing fails for the first route selected. In response, ingress MP 202 may update the status of Diameter peer node 220 on egress MP 204 to "Unavailable" and select a route to another peer node, i.e., Diameter peer node 820. Ingress MP 202 may also create a new Hop-by-Hop identifier containing its MP identifier and re-forward the Diameter request message to egress MP 804, which controls the new route. Egress MP 804 then forwards the Diameter request message to Diameter peer node 820. Diameter peer node 820 responds by sending a Diameter answer message indicating success (i.e., DIAMETER_SUCCESS) back to egress MP 804. When egress MP 804 receives a Diameter answer message from Diameter peer node 820, egress MP 804 routes the Diameter answer message to ingress MP 202, which is identified by the Hop-by-Hop identifier. Ingress MP 202 may then, in turn, forward the Diameter answer message to Diameter peer node 218.

Figure 9:
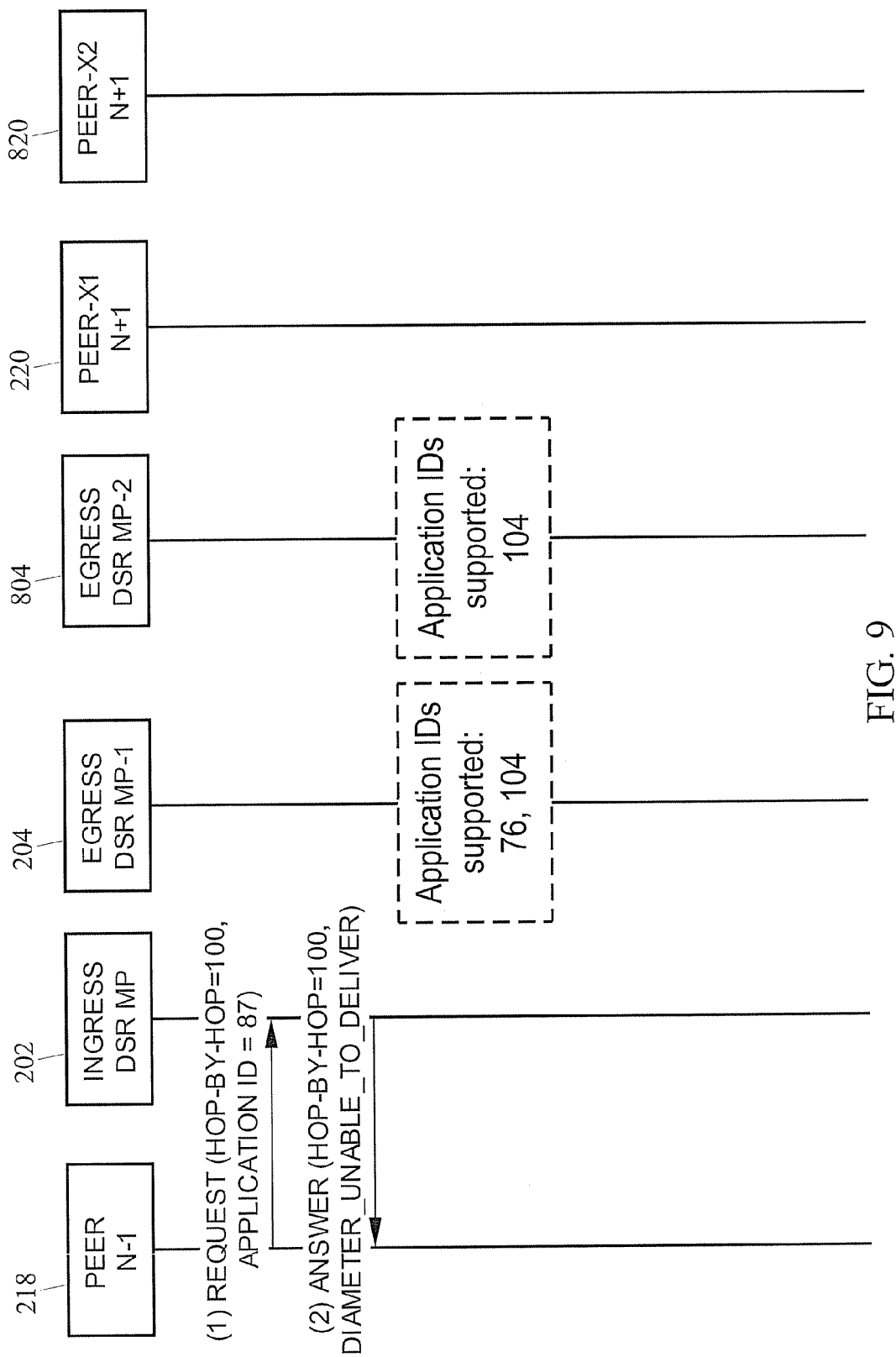
FIG. 9 is a message sequence diagram illustrating no routes supporting a particular application identifier in an ingress request message according to an embodiment of the subject matter described herein.

FIG. 9 is an exemplary signaling flow diagram illustrating a scenario where no routes support the application identifier in an ingress Diameter request message according to an embodiment of the subject matter described herein. Diameter peer node 218 is depicted as sending a Diameter request message, which indicates the need for a Diameter application identified by ID=87, to ingress MP 202. Ingress MP 202 may search ART and PRT (not shown) in order to determine if parameters in the received Diameter request message matches a PRT rule "Route to Peer", which is then paired with a Route List Name. The Route List's Active Route Group may indicate two Available routes (e.g., egress MP 204 to peer node 220 and egress MP 804 to peer node 820). However, in this scenario, neither Diameter peer node 220 nor Diameter peer node 820 supports the Application ID=87. Consequently, ingress MP 202 sends a Diameter answer message, which indicates that the Diameter request message was unable to be delivered, to Diameter peer node 218.

Figure 10:
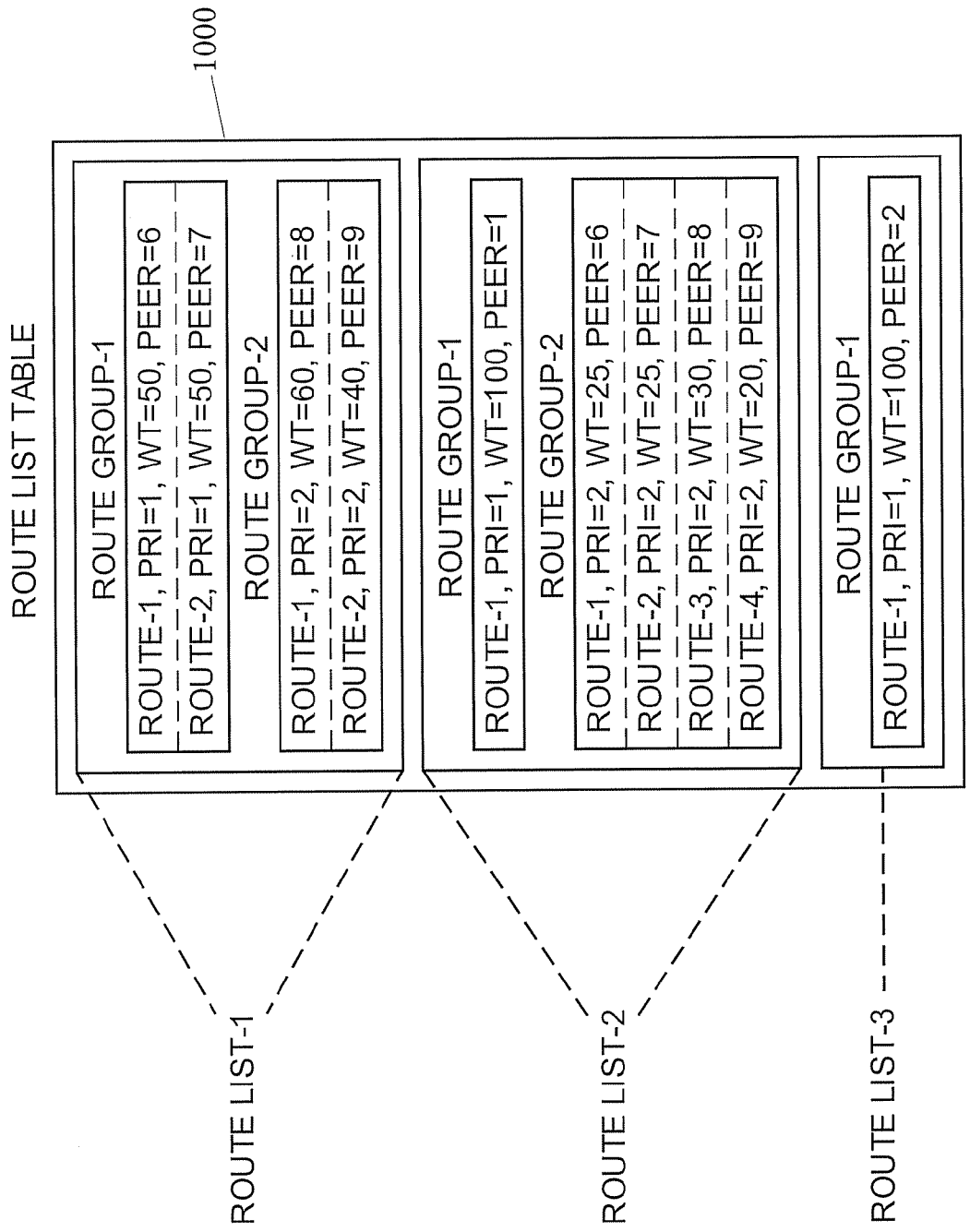
FIG. 10 is a block diagram illustrating an exemplary route list table according to an embodiment of the subject matter described herein.
Figure 11:
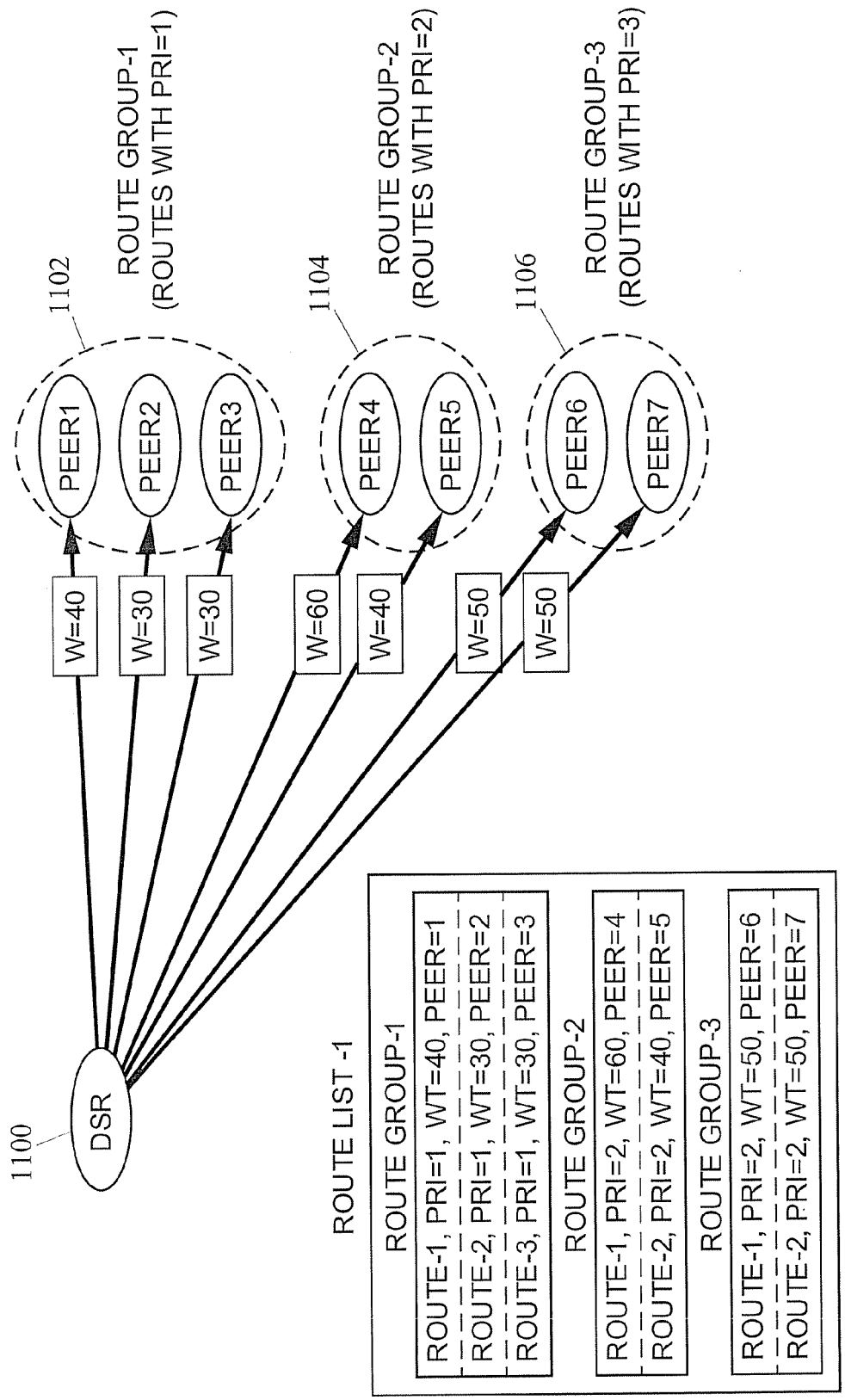
FIG. 11 is a conceptual view of multiple route groups in a route list according to an embodiment of the subject matter described herein.

In one embodiment, a scalable DSR may be used to route Diameter messages to Diameter peer nodes. After local application routing has completed on the DSR (or not invoked if the DSR has no locally configured services/applications), the ingress DRL on a DSR may search the PRT using parameters included in the Diameter message. In one embodiment, the PRT may include a plurality of message content matching rule entries, each of which may have one of the following Actions assigned by a network operator. For example, the assigned Action may either be "Route to Peer" or "Send Answer response". If the Action is "Route to Peer", the rule may be associated with a "Route List" that the ingress DRL can use to route the Diameter message towards the ultimate message destination (i.e., a Diameter peer node). In one embodiment, a Route List consists of one or more routes, each of which is associated with a specific Diameter peer node. An exemplary route list 1000 is depicted in FIG. 10. FIG. 10 depicts an exemplary route table 1000 that includes a plurality of route lists (e.g., route list-1, route list-2, route list-3). FIG. 11 illustrates a conceptual view of an exemplary route list that includes multiple route groups. Specifically, FIG. 11 depicts the conceptual view of route list-1 in route list table 1000 (as shown in FIG. 10). DSR 1100 may communicate with three Diameter peer nodes in route group 1102 via three weighted routes. Notably, DSR 110 may send Diameter messages to route groups 1104 and 1106 via the weighed routes as shown in FIG. 11.

As indicated above, a "route" may actually represent a specific Diameter peer node. Because more than one route can be assigned to a "Route List", each route may be assigned a priority and weight to provide assistance in the route selection process. A set of routes in a Route List with equal priority may be called a "Route Group". In one embodiment, a Route Group in a Route List may be used for routing messages selected by a PRT rule. The Route Group that is currently being used for routing, based on Route Group availability and capacity rules, may be called the "Active Route Group."

The routing of Diameter messages from a DSR to a Diameter peer node is conducted in accordance with certain rules or objectives. In one embodiment, the DSR may support routing to Diameter peer nodes that is consistent with DNS load-share routing required by 1) the ability to define multiple Route Groups to a Diameter peer node using costs/priorities and/or 2) the ability to load share messages across multiple routes within the same priority (Route Group) using route weights. However, the DSR may not select a route within a Route Group if the Diameter peer node does not support the Diameter application indicated by the application ID in the message or if a Diameter peer node has already processed the message (i.e., message looping detection). Also, the DSR may not select a route if the Diameter peer node's transport layer queue is full. In one embodiment, the DSR may reduce the percentage of messages the DSR routes to a Diameter peer node based on the peer node's level of congestion. In another embodiment, the DSR may not attempt to select a route more than once for routing the same Diameter message. In yet another embodiment, the DSR should not exceed the Diameter peer node's rated capacity.

In one embodiment, the DSR may attempt to route a message to a Diameter peer node using the highest priority Route Group in the Route List that is available. A Route Group is "available" if all of the following criteria are met. First, at least one route in the set is "Available" and the available routes in the set meet the minimum capacity requirement assigned to the Route List. Please note that "capacity" may be defined in terms of route weights. For example, if the minimum capacity assigned to a Route List is "5", and Route Group-1 is comprised of Route-A (weight=4) and Route-B (weight=6), then Route Group-1 is Available only if Route-B is Available. Also, the DSR may be configured to send a Diameter answer message indicating "DIAMETER_UNABLE_TO_DELIVER" if the peer routing process selects a Route List that does not have any available Route Groups.

As mentioned above, the PRT may include a number of contents, such as a rule name, a rule priority, and a plurality of message selection parameters. As used herein, the rule name is an operator provided name for identification. Similarly, the rule priority refers to the selection of a table entry with the highest priority in the event a table query finds multiple matches. As used herein and indicated above, rule message selection parameters include Diameter message parameters that the user may specify as criteria for message matching. Exemplary rule message selection parameters in the PRT (which may match parameters in the Diameter message) include: 1) a Destination-Realm which is similar to Diameter Realm Routing Table and has an OctetString core data type, 2) an Application ID which is similar to Diameter Realm Routing Table and may be represented by a 32-bit value, and 3) a Destination-Host which is not unlike to "Host Identity" in a Diameter Peer Table and has an OctetString core data type, 4) the Origin-Realm, which identifies the realm from which the message was originated and has an OctetString core data type, 5) an Origin-Host that identifies the Host from which the message was originated, 6) a User-Name that identifies the user for which this service is being invoked and has an OctetString core data type, and 7) a Command-Code that that includes 24 bits and identifies the request message type. Any value may be supported in order to later add application-specific command-codes.

Additional contents of the PRT may include an "Action", which may be defined as the action to perform when the rule is invoked. Exemplary actions include "Route to Peer" (where the Diameter message may be routed to a Diameter peer node defined by the rule's "Route List" field) and "Send Answer Response", which is a Diameter answer response that may be sent using the rules' Result-Code field when a Diameter peer node is unavailable.

In one embodiment, the PRT may also include "Route List Name" and a "Result-Code" parameters associated with a given Action parameter. The Route List name indicates the Route List to be used when the "Action" is set to "Route to Peer". Similarly, the Result-Code includes a Result-Code AVP value to be used when the "Action" is set to "Send Answer Response." The default value of the Result-Code may be 3002 "DIAMETER_UNABLE_TO_DELIVER. For example, if the ingress DRL searches the PRT and is unable to find a match, then a routing failure occurs. The DRL may then send a DIAMETER_UNABLE_TO_DELIVER Answer response message to the original sending Diameter peer node.

FIG. 12 depicts an exemplary PRT 1202 and a related route list table 1204. Notably, PRT 1202 includes a column for one or more route list names, which indicates a specific portion of route list table 1204 that needs to be accessed in order to select the appropriate route. The entries of route list table 1204 are assigned either a priority=1 or priority=2. Notably, for each route group, the entries indicating a priority=1 constitute an Active Route Group while the entries indicating a priority=2 in constitute a Standby Route Group.

In one embodiment, a PRT utilizes one or more default entries. With the ability to wildcard PRT entries and assign priorities to rules, a network operator may specify routing for Diameter request messages addressed to a specific Destination-Realm (regardless of Application ID), a specific Application ID (regardless of Destination-Ream), or for all request messages. This flexibility enables the network operator to configure one or more specific routing rules and then utilize one or more default entries to handle everything else. For example, FIG. 13 depicts an exemplary PRT 1300 that includes four routing rules. In this example, the local realm is a realm referenced as "myrealm.com". Rule-3 in PRT 1300 is the default for local realm applications other than applications 55 and 57. Similarly, PRT 1300 indicates that Rule-4 is default for all other realms.

FIG. 14 depicts another exemplary PRT that includes a plurality of routing rules. In this Figure, the local realm is "local.com". Referring to the first column of PRT 1400, rules 1-3 are routing rules for known non-local realms, rules 4-5 perform routing for local application 10, rules 6-7 perform routing for local application 24, rule 8 is default rule for local realm (e.g., for Application IDs other than 10 or 24), and Rule 9 is default for all other non-local realms.

FIG. 15 depicts another exemplary PRT that includes a plurality of rules. In this Figure, the local realm is "local.com". Referring to the first column of PRT 1500, rules 1-4 are default rules created for a local realm Diameter Client and/or Server peer which indicate support for a single application ID in the CER/CEA handshake. This may be used for Destination-Host routing. Similarly, rules 5-6 in PRT 1500 are for a local realm Diameter Proxy Agent peer which indicates support for two different application IDs in the CER/CEA handshake. Lastly, rules 7-8 are routing rules for a local realm Diameter Relay Agent peer which indicates support for all application IDs (0xffffffff) in a CER/CEA handshake.

In one embodiment, a PRT and associated route lists may be used to route Diameter request messages to a Diameter peer node. For example, entries in the PRT may utilize priority routing schemes that include priority indicators and load sharing routing schemes that include weights to facilitate the routing of Diameter messages. Priority routing includes defining more than one route to a destination and assigning a relative priority to each route. With priority routing, the route with the highest priority available Route Group (as indicated with a priority indicator) may be selected for routing. Likewise, load Share routing allows for the distributing of Diameter the messages to a set of routes with equal priority (i.e., a Route Group). The distribution of Diameter messages within a Route Group is controlled by assigning a relative weight to each route within a Route Group. The percentage of messages sent to a given route in the Route Group may be determined from the set of Available routes in the Route Group (i.e., Unavailable routes are excluded) using the calculation:

Percent=100*(weight of Route-*X*)/(sum of the weights of the available routes in the Route Group)

In one embodiment, a route list may be comprised of multiple route groups in a PRT, wherein each route group has a unique priority within its route list. Two types of route list redundancy schemes may be supported. A first redundancy scheme may include all route groups within a route list being eligible for routing messages. In such an embodiment, the route selection may start with the highest priority route group with overflows assigned to lower priority groups when no routes in the higher priority can be selected. A second redundancy scheme may involve Active/Standby route groups. For example, one Route Group for routing messages may be designated as the "Active Route Group" while all other Route Groups serve as backups to the Active Route Group in the event the Active Route Group fails. These alternate groups are referred to as "Standby Route Groups". In one embodiment, the highest priority Route Group is always the Active Route Group if at least one route in the Route Group is Available. The Active/Standby redundancy scheme is typically the default Route List redundancy option supported by the DRL.

FIG. 16 depicts an exemplary route list capacity table 1600 in a PRT that includes route list capacities. The route list capacity may be defined in terms of a weight, similarly to weights assigned to routes within the route list. In one embodiment, the capacity of a Route Group is the sum of the weights of its available routes as shown in route list capacity table 1600. The DRL may maintain a status for each Route Group in route list capacity table 1600 that can be used to determine which Route Group in a Route List should be the Active Route Group for routing all messages for that Route List.

Similarly, the present subject matter may address a route group's availability status. In one embodiment, a route group's availability status may be expressed in terms of its capacity. Statuses may include 1) Available, 2) Degraded, or 3) Unavailable. As used herein with respect to a route group's availability status, "Available" is intended to mean the route group's capacity meets or exceeds the minimum value assigned to the route list, "Degraded" is intended to mean the route group's capacity is greater than zero but less than the minimum value assigned to the route list, and "Unavailable" is intended to mean the route group's capacity is zero.

In one embodiment, a Route Group is designated the "Active Route Group" for the Route List when it meets one of the following criteria: 1) it is the Highest priority Route Group among Route Groups with the status of "Available", or 2) it is the Highest capacity Route Group when no Route Groups have the status "Available". If more than one Route Group has the same capacity, then the highest priority Route Group is designated as the Active Route group.

In one embodiment, the DRL evaluates and may change the Route Group status and the designated "Active Route Group" for a Route List when any of the following events occur: 1) a Peer (Route) status change (i.e., this potentially impacts multiple Route Lists), 2) the Route added to a Route List by operator (i.e., this increases capacity of a Route Group if peer's status is Available), 3) the Route is deleted from a Route List by a network operator (i.e., this decreases current capacity of a Route Group if peer's status is Available), 4) the route's priority is modified by the network operator, or 5) the route's weight is modified by operator (i.e., this changes the current capacity of associated Route Group if the Diameter peer node's status is Available). In one embodiment, an availability status may be maintained for each Route List to quickly facilitate routing decisions when a Route List is selected by a PRT rule. A Route List availability status may be identical to the status of its Active Route Group. This is depicted in FIG. 17, which illustrates an exemplary Route List 1700 that is comprised of Route Groups 1, 2, and 3.

The present subject matter may include a peer table that contains the list of Diameter peer nodes to which a DSR has direct connections for routing Diameter messages via TCP, SCTP, or UDP transport. Notably, all of the information a DSR MP needs to know about a peer node is stored in a peer record. Any peer-specific information required in making a decision of routing a message to a peer node may be stored in this table. Peer-specific information may include the peer node's availability status (i.e., whether at least one active transport connection is available), the peer node's congestion state, and a list of applications IDs the Diameter peer node supports (acquired during Capabilities-Exchange). Any information about the Diameter peer node which is acquired during the Capabilities-Exchange may be stored in the peer node's record so it can be viewed by the network operator.

In one embodiment, the present subject matter may allow for route selection by the ingress DRL. When peer routing is invoked for a Diameter message that matches a PRT rule Action of "Route to Peer", the DRL may use the Route List assigned to that rule for routing the message to a Diameter peer node. In one embodiment, the DRL uses the Route List's currently designated Active Route Group to route the Diameter message. Notably, the "Active Route Group" designation may be determined asynchronously from message routing based on peer status changes and route list management events. If the Active Route Group has more than one route, then the DRL creates a list of available routes from the Route Group that will be used for all subsequent decisions about routing this message. In one embodiment, this list is stored in the "pending transaction record" for this Diameter message in case message rerouting is required after a message is forwarded. Also, Diameter message rerouting may occur after a Diameter message is forwarded if a Diameter peer node failure occurs or if a negative Diameter answer response message is received.

Once a list of available routes for the Diameter message has been created, the DRL may select a route from the list based on the relative weights assigned to each route. As indicated above, weights may be used to proportion traffic across routes in the Route Group. A weight assigned to a route does not serve as the route's priority for route selection within the Route Group, but rather the assigned weight serves to calculate the probability that the route may be selected from the list. For example, if a Route Group is comprised of four routes with weights 40, 30, 20, and 10, respectively, then the probability that Route-1 will be selected first for routing any message is 40% (i.e., 40/(40+30+20+10)). In one embodiment, the DRL selects a route from the list using a statistical algorithm that utilizes the route weights. For example, the algorithm may select Route-1 40% of the time.

Once the DRL selects a route from the list, the DRL determines whether it is possible to use that route based on certain criteria. In one embodiment, the criteria includes: 1) the Diameter message's Application ID is supported by the peer, 2) the Diameter peer node has not previously processed the message (e.g., the peer node's identity does not match one of the message's Route-Record AVPs), 3) the peer node's transport layer queue is not full, 4) the peer node is congested but the Diameter message meets the criteria for forwarding the message to the peer (as described below with respect to peer congestion), 5) the peer node's status is Unavailable, and 6) the peer node is no longer associated with the Route Group or Route List.

Figure 18:
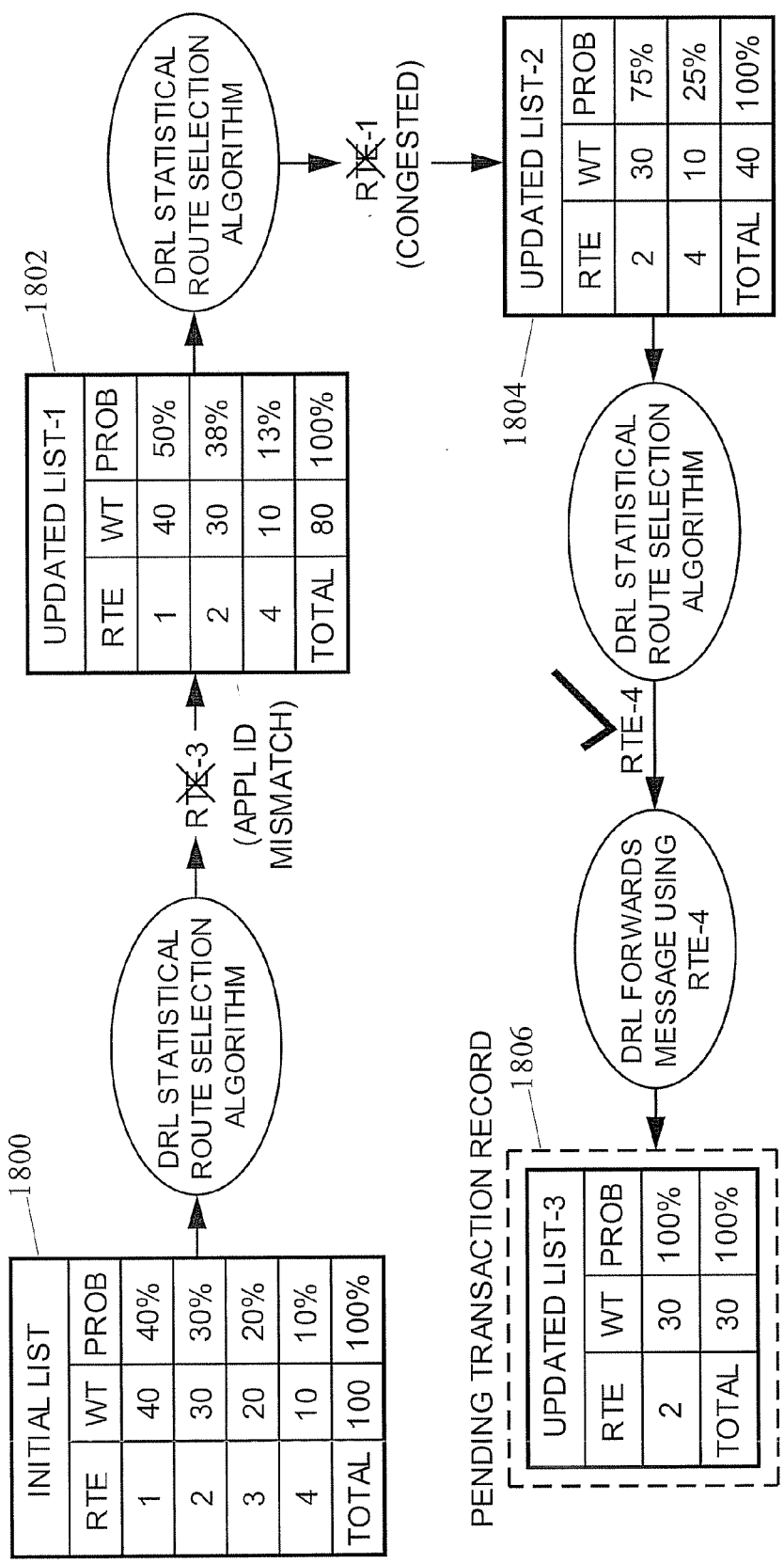
FIG. 18 is a flow diagram that illustrates an exemplary route selection process performed by the Diameter routing layer of a Diameter signaling router according to an embodiment of the subject matter described herein.

If a Diameter peer node matches the route selection criteria, standard Request message processing will be invoked (as mentioned above) and the message will be queued on the Diameter peer node's transport layer queue. If a Diameter peer node does not match the route selection criteria then the DRL may remove that route from the list (i.e., a route should never be considered more than once for routing the same message) and the DRL may re-invoke the statistical route selection algorithm based on the remaining routes in the list. In the previous example, if Route-1 was selected first but did not meet the additional criteria for using that route as defined above, the new list would be limited to routes 2, 3, and 4 with weights 30, 20, and 10, respectively. Thus, with the smaller list of routes, the probability of selecting Route-2 would be 50% (i.e., 30/(30+20+10)=50%). Notably, the route selection process continues until a viable route is found or the list is exhausted. Specifically, if no peer nodes in the Active Route Group meet the route selection criteria, the DRL may abandon peer routing and send a DIAMETER_UNABLE_TO_DELIVER Answer response message to the Diameter peer node that originally sent the Diameter request message. FIG. 18 illustrates an exemplary route selection process of using a list of equal priority routes with assigned weights. In this Figure, the Active Route Group has four available routes with weights 40, 30, 20, and 10, respectively. Specifically, a statistical route selection algorithm is executed by the DRL using the information in initial list 1800. The DRL determines that route 3 is unavailable because of an application ID mismatch. Consequently, the DRL executes a statistical route selection algorithm using the information in updated list 1802 (which does not include route 3). The DRL then determines that route 1 is unavailable due to congestion. The DRL then executes a statistical route selection algorithm using the information in updated list 1804 (which does not include route 1), which results in the selection of route 4. The DRL then forwards the Diameter message using route 4 and generates a pending transaction record 1806. Record 1806 may be subsequently used if the Diameter message must be re-routed due to a peer node failure or the like.

In one embodiment, the present subject matter may utilize peer application identifiers to conduct route selection. As mentioned above, a Diameter message should not be routed to a Diameter peer node that does not support the Application identifier indicated in the Diameter message. The Diameter base protocol indicates that each time a first transport connection is established between Diameter peer nodes, a Capabilities-Exchange is performed before the transport connection is allowed. Namely, a peer node will send the lists of Application IDs it supports in the CER or CEA message. When a DSR receives a list of Application IDs from a peer node, these identifiers are stored in the Peer Table to be accessed during message routing. When the DSR message routing selects a route from a Route List associated with a peer node, the peer node's supported Application ID list is interrogated to verify that the Application ID in the message matches one of the Application IDs supported by the peer node. If an Application ID match is not found, the DSR bypasses this route and continues the route selection process.

In one embodiment, the present subject matter may consider peer congestion to conduct route selection. A Diameter peer node may report congestion by sending an Answer response with Result-Code AVP set to DIAMETER_TOO_BUSY. The congested node is identified by the Origin-Host in the Answer response (i.e., the response may not have been sent by a peer node). The DRL should only be concerned with peer congestion, not upstream node congestion. That is, the Diameter protocol is only peer status aware such that the status of upstream nodes is not tracked or managed. In one embodiment, the DRL may detect peer congestion via DIAMETER_TOO_BUSY Answer responses containing the peer node's identity in the Origin Host AVP and via the transport layer interface to the peer (e.g., outbound queue depth, etc.).

A peer congestion detection and control solution may be implemented in DSR that includes monitoring based on internal queue lengths (e.g., SCTP association egress queue). Currently, simple congestion control procedure may involve discarding the Diameter message if the queue is full. Thus, a DSR may bypass this route during route selection when a Diameter peer node's SCTP egress queue is full. In one embodiment, a DIAMETER_TOO_BUSY Answer response from a peer node may be used to determine the congestion level of peer node. For example, upon receipt of an initial DIAMETER_TOO_BUSY message, the peer congestion level may be set to "1". The DSR may maintain a rolling window of percentage of Request messages rejected by the DIAMETER_TOO_BUSY response and adjust the peer node's congestion level accordingly. It is worth noting that a DIAMETER_TOO_BUSY Answer response received from a peer node may have been originated by an upstream node. The DRL validates that the busy response was initiated by the peer node (i.e., Origin-Host AVP set to the peer node's FQDN) in order to determine if the peer node is congested.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for routing Diameter messages between multiple message processors within a Diameter Signaling Router (DSR), the method comprising:
   receiving, at an ingress Diameter message processor included within the DSR, a Diameter message from a first Diameter node, wherein the Diameter message includes Diameter parameter values;
   accessing, using the ingress Diameter message processor, Diameter peer routing information to determine an egress Diameter message processor among a plurality of egress Diameter message processors within the DSR and associated with a second Diameter node that is a peer of the DSR and to which the Diameter message is to be forwarded, wherein a Diameter routing layer (DRL) in the DSR extracts the Diameter parameter values from the Diameter message to search the Diameter peer routing information stored in a peer routing table to locate a rule entry that identifies the egress Diameter message processor;
   modifying, using the ingress Diameter message processor, the Diameter message to contain a hop by hop identifier that identifies the ingress Diameter message processor; and
   forwarding the Diameter message containing the hop-by-hop identifier that identifies the ingress Diameter message processor to the determined egress Diameter message processor, wherein the egress Diameter message processor utilizes the hop-by-hop identifier to route a Diameter answer message associated with the Diameter message to the ingress Diameter message processor.

2. The method of claim 1 comprising transmitting, at the determined egress Diameter message processor, the Diameter message to the second Diameter node.

3. The method of claim 2 wherein the Diameter answer message originates from the second Diameter node.

4. The method of claim 1 comprising transmitting, at the ingress Diameter message processor, the Diameter answer message to the first Diameter node.

5. The method of claim 1 wherein the ingress and egress Diameter message processors share the Diameter peer routing information.

6. The method of claim 1 wherein accessing the Diameter peer routing information includes:
   searching a peer routing table in the DSR using parameters contained in the received Diameter message;
   selecting an entry in the peer routing table that matches the parameters;
   creating a list of available routes from a designated active route group in the peer routing table; and
   selecting a route from the created list based on a statistical algorithm, wherein the selected route is associated with the egress Diameter message processor.

7. The method of claim 6 wherein the parameters contained in the received Diameter message include at least one of: a Destination-Realm parameter, an Application ID parameter, a Destination-Host parameter, an Origin-Realm parameter, an Origin-Host parameter, a User-Name parameter, and a Command-Code parameter type.

8. The method of claim 4 wherein each of the ingress Diameter message processor and the egress Diameter message processor is configured to handle both the Diameter message and the Diameter answer message by utilizing hop-by-hop identifiers.

9. The method of claim 3 comprising forwarding the Diameter answer message to a third Diameter message processor in the event the ingress Diameter message processor failed prior to the egress Diameter message processor receiving the Diameter answer message, and transmitting, from the third Diameter message processor, the Diameter answer message to the first Diameter node.

10. A method for routing Diameter messages between multiple message processors within a Diameter Signaling Router (DSR), the method comprising:
   receiving, at an ingress Diameter message processor the DSR, a Diameter message from a first Diameter node, wherein the Diameter message includes Diameter parameter values;
   accessing, using the ingress Diameter message processor, Diameter peer routing information to determine an egress Diameter message processor among a plurality of egress Diameter message processors within the DSR and associated with a second Diameter node that is a peer of the DSR and to which the Diameter message is to be forwarded, wherein a Diameter routing layer (DRL) in the DSR extracts the Diameter parameter values from the Diameter message to search the Diameter peer routing information stored in a peer routing table to locate a rule entry that identifies the egress Diameter message processor;
   forwarding the Diameter message to the determined egress Diameter message processor;
   transmitting, at the determined egress Diameter message processor, the Diameter message to the second Diameter node;
   receiving, at the determined egress Diameter message processor, a Diameter answer message associated with the Diameter message from the second Diameter node;
   forwarding the Diameter answer message to the ingress Diameter message processor, and transmitting, at the ingress Diameter message processor, the Diameter answer message to the first Diameter node; and
   wherein the each of the ingress Diameter message processor and the egress Diameter message processor is configured to handle both the Diameter message and the Diameter answer message by maintaining associated state information.

11. A system for routing Diameter signaling messages, the system comprising:
   a Diameter signaling router (DSR) comprising:
      a memory for storing Diameter peer routing information;
      an ingress Diameter message processor configured to receive a Diameter message from a first Diameter node, wherein the Diameter message includes Diameter parameter values, access the Diameter peer routing information to determine an egress Diameter message processor among a plurality of egress Diameter message processors within the DSR and associated with a second Diameter node that is a peer of the DSR and to which the Diameter message is to be forwarded, wherein a Diameter routing layer (DRL) in the DSR extracts the Diameter parameter values from the Diameter message to search the Diameter peer routing information stored in a peer routing table to locate a rule entry that identifies the egress Diameter message processor, modify the Diameter message to contain a hop-by-hop identifier that identifies the ingress Diameter message processor, and forward the Diameter message containing the hop-by-hop identifier that identifies the ingress message processor to the determined egress Diameter message processor, wherein the egress Diameter message processor utilizes the hop-by-hop identifier to route a Diameter answer message associated with the Diameter message to the ingress Diameter message processor.

12. The system of claim 11 wherein the egress Diameter message processor is configured to transmit the Diameter message to the second Diameter node.

13. The system of claim 12 wherein the Diameter answer originates from the second Diameter node.

14. The system of claim 13 wherein the ingress Diameter message processor is configured to transmit the Diameter answer message to the first Diameter node.

15. The system of claim 11 wherein the ingress and egress Diameter message processors share the Diameter peer routing information.

16. The system of claim 11 wherein the ingress Diameter message processor is configured for:
    searching the peer routing information in the DSR using parameters contained in the received Diameter message;
    selecting an entry in the peer routing information that matches the parameters;
    creating a list of available routes from a designated active route group in the peer routing table; and
    selecting a route from the created list based on a statistical algorithm, wherein the selected route is associated with the egress Diameter message processor.

17. The system of claim 16 wherein the parameters contained in the received Diameter message includes at least one of: a Destination-Realm parameter, an Application ID parameter, a Destination-Host parameter, an Origin-Realm parameter, an Origin-Host parameter, a User-Name parameter, and a Command-Code parameter type.

18. A system for routing Diameter signaling messages, the system comprising:
    a Diameter signaling router (DSR) comprising:
        a memory for storing Diameter peer routing information;
        an ingress Diameter message processor configured to receive a Diameter message from a first Diameter node, wherein the Diameter message includes Diameter parameter values, access the Diameter peer routing information to determine an egress Diameter message processor among a plurality of egress Diameter message processors within the DSR and associated with a second Diameter node that is a peer of the DSR and to which the Diameter message is to be forwarded, wherein a Diameter routing layer (DRL) in the DSR extracts the Diameter parameter values from the Diameter message to search the Diameter peer routing information stored in a peer routing table to locate a rule entry that identifies the egress Diameter message processor, and forward the Diameter message to the determined egress Diameter message processor;
        wherein the egress Diameter message processor associated with the DSR is configured to receive the Diameter message and to transmit the Diameter message to the second Diameter node;
        wherein egress Diameter message processor is configured to receive a Diameter answer message associated with the Diameter message from the second Diameter node, and to forward the Diameter answer message to the ingress Diameter message processor; and
        wherein the each of the ingress Diameter message processor and the egress Diameter message processor is configured to handle both the Diameter message and the Diameter answer message by maintaining associated state information.

19. The system of claim 13 wherein each of the ingress Diameter message processor and the egress Diameter message processor is configured to handle both the Diameter message and the Diameter answer message by utilizing hop-by-hop identifiers.

20. The system of claim 12 wherein the egress Diameter message processor is configured to forward the Diameter answer message to a third Diameter message processor in the event the ingress Diameter message processor failed prior to the egress Diameter message processor receiving the Diameter answer message, and wherein the third Diameter Message processor is configured to transmit, from the third Diameter message processor, the Diameter answer message to the first Diameter node.

21. A non-transitory computer readable medium comprising computer executable instructions embodied in a computer readable medium and when executed by a processor of a computer performs steps comprising:
    receiving, at an ingress Diameter message processor included within the DSR, a Diameter message from a first Diameter node, wherein the Diameter message includes Diameter parameter values;
    accessing, using the ingress Diameter message processor, Diameter peer routing information to determine an egress Diameter message processor among a plurality of egress Diameter message processors within the DSR and associated with a second Diameter node that is a peer of the DSR and to which the Diameter message is to be forwarded, wherein a Diameter routing layer (DRL) in the DSR extracts the Diameter parameter values from the Diameter message to search the Diameter peer routing information stored in a peer routing table to locate a rule entry that identifies the egress Diameter message processor;
    modifying, using the ingress Diameter message processer, the Diameter message to contain a hop-by-hop identifier that identifies the ingress Diameter message processor; and
    forwarding the Diameter message containing the hop-by-hop identifier that identifies the ingress Diameter message processor to the determined egress Diameter message processor, wherein the egress Diameter message processor utilizes the hop-by-hop identifier that identifies the ingress Diameter message processor to route a Diameter answer message associated with the Diameter message to the ingress Diameter message processor.

22. A method for routing Diameter messages between multiple Diameter message processors in a Diameter signaling router (DSR), the method comprising:
    receiving, at an ingress Diameter message processor included within the DSR, a Diameter message from a first Diameter node, wherein the Diameter message includes Diameter parameter values;
    forwarding the Diameter message from the ingress Diameter message processor to an application message processor associated with the DSR;

querying, at the application message processor, stored Diameter peer routing information to determine an egress Diameter message processor among a plurality of egress Diameter message processors within the DSR and associated with a second Diameter node that is a peer of the DSR and to which the Diameter message is to be forwarded, wherein a Diameter routing layer (DRL) in the DSR extracts the Diameter parameter values from the Diameter message to search the Diameter peer routing information stored in a peer routing table to locate a rule entry that identifies the egress Diameter message processor;

modifying the Diameter message to contain a hop-by-hop identifier that identifies the ingress Diameter message processor; and forwarding the Diameter message containing the hop-by-hop identifier that identifies the ingress message processor to the determined egress Diameter message processor, wherein the egress Diameter message processor utilizes the hop-by-hop identifier to route a Diameter answer message associated with the Diameter message to the ingress Diameter message processor.

23. The method of claim 22 wherein forwarding the Diameter message includes:

forwarding the Diameter message from the application processor to the determined egress Diameter message processor without forwarding the message back to the ingress message processor.

24. The method of claim 23 further comprising:

transmitting, at the egress Diameter message processor, the Diameter message to the second Diameter node;

wherein the Diameter answer message originates from the second Diameter node; and transmitting, at the ingress Diameter message processor, the Diameter answer message to the first Diameter node.

25. A system for routing Diameter signaling messages, the system comprising:

a Diameter signaling router (DSR) comprising:
an application message processor;
a memory for storing Diameter peer routing information;
an ingress Diameter message processor configured to receive a Diameter message from a first Diameter node, modify the Diameter message to contain a hop-by-hop identifier that identifies the ingress Diameter message processor, and forward the Diameter message to the application message processor, wherein the Diameter message includes Diameter parameter values; and wherein the application message processor is configured to receive the Diameter message from the ingress Diameter message processor, to use the Diameter peer routing information to determine an egress Diameter message processor among a plurality of egress Diameter message processors within the DSR and associated with a second Diameter node that is a peer of the DSR and to which the Diameter message is to be forwarded, wherein a Diameter routing layer (DRL) in the DSR extracts the Diameter parameter values from the Diameter message to search the Diameter peer routing information stored in a peer routing table to locate a rule entry that identifies the egress Diameter message processor, and forward the Diameter message to the determined egress Diameter message processor, wherein the egress Diameter message processor utilizes the hop-by-hop identifier that identifies the ingress Diameter message processor to route a Diameter answer message associated with the Diameter message to the ingress Diameter message processor.

26. The system of claim 25 wherein the application message processor is configured to forward the Diameter message to the determined egress Diameter message processor without forwarding the Diameter message back to the ingress Diameter message processor.

27. The system of claim 25 wherein the egress Diameter message processor is configured to transmit the Diameter message to the second Diameter node, wherein the Diameter answer message originates from the second Diameter node.

28. The system of claim 27 wherein the ingress Diameter message processor is configured to transmit the Diameter answer message to the first Diameter node.

* * * * *